United States Patent
Hasebe

(10) Patent No.: US 12,106,471 B2
(45) Date of Patent: Oct. 1, 2024

(54) IMAGE PROCESSING METHOD FOR IMAGING A CELL AGGREGATE AND RECORDING MEDIUM THEREFOR

(71) Applicant: SCREEN HOLDINGS CO., LTD., Kyoto (JP)

(72) Inventor: Ryo Hasebe, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 497 days.

(21) Appl. No.: 17/345,446

(22) Filed: Jun. 11, 2021

(65) Prior Publication Data

US 2021/0398276 A1  Dec. 23, 2021

(30) Foreign Application Priority Data

Jun. 19, 2020 (JP) .................. 2020-106271
Jun. 19, 2020 (JP) .................. 2020-106272

(51) Int. Cl.
*G06T 7/00* (2017.01)
*G06T 7/11* (2017.01)
*G06T 7/50* (2017.01)

(52) U.S. Cl.
CPC .............. *G06T 7/0012* (2013.01); *G06T 7/11* (2017.01); *G06T 7/50* (2017.01);
(Continued)

(58) Field of Classification Search
CPC . G06T 7/0012; G06T 7/11; G06T 7/50; G06T 2207/10101; G06T 2207/30024; G06T 2207/30044; G06T 7/60; G01N 21/17; G01N 2021/1785; G01N 2021/1787; G01N 2201/0492; A61B 5/0066;
(Continued)

(56) References Cited

U.S. PATENT DOCUMENTS

2012/0101372 A1  4/2012 Teramura et al.
2012/0120368 A1  5/2012 Fujimora et al.
(Continued)

FOREIGN PATENT DOCUMENTS

CN  111007062 A  4/2020
CN  111047577 A  4/2020
(Continued)

OTHER PUBLICATIONS

JP-2019132710-A—original and english translation (Year: 2019).*
(Continued)

*Primary Examiner* — Gandhi Thirugnanam
*Assistant Examiner* — Aaron Joseph Sorrin
(74) *Attorney, Agent, or Firm* — Rimon P.C.

(57) ABSTRACT

An image processing method comprises obtaining three-dimensional image data representing a three-dimensional image of a cell aggregate with a cavity inside obtained by optical coherence tomography imaging, obtaining a thickness distribution representing a thickness of the cell aggregate between an outer surface of the cell aggregate facing an outside space and an inner surface thereof facing the cavity at each position based on the three-dimensional image data, and detecting protrusion parts having a prominent thickness as compared to a surrounding region based on the thickness distribution.

10 Claims, 16 Drawing Sheets

(52) U.S. Cl.
CPC ............... *G06T 2207/10101* (2013.01); *G06T 2207/30024* (2013.01); *G06T 2207/30044* (2013.01)

(58) Field of Classification Search
CPC .............. A61B 5/0073; G01B 9/02063; G01B 9/02091; G06N 20/00
See application file for complete search history.

(56) References Cited

U.S. PATENT DOCUMENTS

| | | |
|---|---|---|
| 2012/0196316 A1 | 8/2012 | Sebesta et al. |
| 2017/0140535 A1 | 5/2017 | Hamamah et al. |
| 2017/0313965 A1 | 11/2017 | Iga et al. |
| 2018/0192866 A1 | 7/2018 | Abou Shousha et al. |
| 2021/0042968 A1* | 2/2021 | Kuromi .............. G01N 15/1433 |
| 2021/0056704 A1 | 2/2021 | Kuromi et al. |

FOREIGN PATENT DOCUMENTS

| | | | | |
|---|---|---|---|---|
| EP | 2443992 A2 * | 4/2012 | ........... | A61B 5/0066 |
| EP | 2460463 A1 * | 6/2012 | ........... | A61B 3/1005 |
| JP | 2011-030626 A | 2/2011 | | |
| JP | 2011-103098 A | 5/2011 | | |
| JP | 2011-194061 A | 10/2011 | | |
| JP | 2012-090690 A | 5/2012 | | |
| JP | 2012-531584 A | 12/2012 | | |
| JP | 2017-521067 A | 8/2017 | | |
| JP | 2019054742 A * | 4/2019 | | |
| JP | 2019132710 A * | 8/2019 | ......... | G01N 15/1475 |
| JP | 2019133429 A * | 8/2019 | ......... | G01N 15/1429 |
| JP | 2020-506743 A | 3/2020 | | |
| KR | 10-2012-0048603 A | 5/2012 | | |
| WO | 2011/007657 A1 | 1/2011 | | |
| WO | 2011/114685 A1 | 9/2011 | | |
| WO | 2016/121065 A1 | 8/2016 | | |

OTHER PUBLICATIONS

JP-2019133429-A—original and english translation (Year: 2019).*
JP-2019054742-A—original and english translation (Year: 2019).*
Extended European Search Report issued in corresponding European Patent Application No. 21178742.9-1210, dated Feb. 3, 2022.
E. S. Filho et al., "A method for semi-automatic grading of human blastocyst microscope images", Human Reproduction, vol. 27, No. 9, Sep. 1, 2012 (Sep. 1, 2012), pp. 2641-2648.
W. Zenan et al., "Automatic Dissection Position Selection for Cleavage-Stage Embryo Biopsy", IEEE Transactions on Biomedical Engineering, IEEE, USA, vol. 63, No. 3, Mar. 1, 2016 (Mar. 1, 2016), pp. 563-570.
Korean Office Action issued in corresponding Korean Patent Application No. 10-2021-0074970, dated Mar. 27, 2023, with English translation.
A. Singh et al., "Automatic Segmentation of Trophectoderm in Microscopic Images of Human Blastocysts", IEEE Transactions on Biomedical Engineering, vol. 62, No. 1, Jan. 2015, pp. 382-393.
Partial European Search Report issued in corresponding European Patent Application No. 21178742.9-1210, dated Nov. 3, 2021.
Notice of Allowance issued in corresponding Japanese Patent Application No. 2020-106271 dated Oct. 31, 2023 w/English MT.
Notice of Allowance issued in corresponding Japanese Patent Application No. 2020-106272 dated Oct. 31, 2023 w/English MT.
Office Action dated on May 31, 2024 issued in the corresponding Chinese Patent Application No. 202110669330.X, w/ English Translation.

* cited by examiner

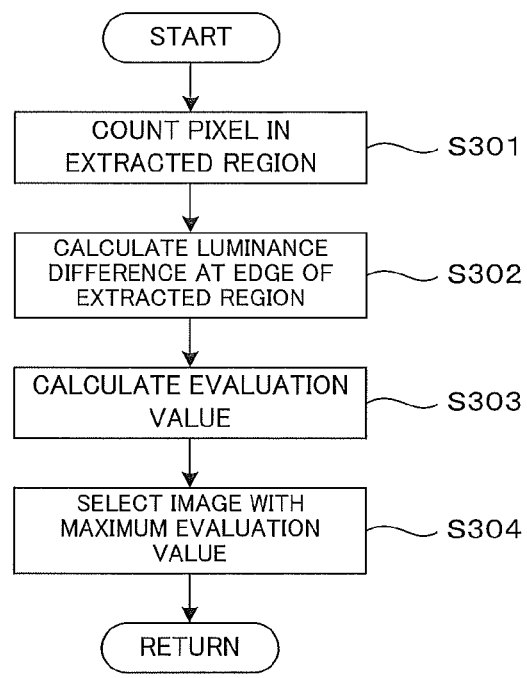

IMAGE PROCESSING METHOD FOR IMAGING A CELL AGGREGATE AND RECORDING MEDIUM THEREFOR

CROSS REFERENCE TO RELATED APPLICATION

The disclosure of Japanese Patent Applications enumerated below including specifications, drawings and claims is incorporated herein by reference in its entirety:
No. 2020-106271 filed on Jun. 19, 2020; and
No. 2020-106272 filed on Jun. 19, 2020.

BACKGROUND OF THE INVENTION

1. Field of the Invention

This invention relates to image processing for imaging a cell aggregate, particularly a cell aggregate with a cavity inside and analyzing the structure of the cell aggregate. For example, this invention relates to an image processing technique for providing information useful for a user who evaluates a fertilized egg from data corresponding to a three-dimensional image obtained by tomographically imaging the fertilized egg.

2. Description of the Related Art

In assisted reproductive technology for the purpose of fertility treatment, for example, an embryo (fertilized egg) fertilized in vitro and cultured for a certain period is returned to a person. However, a pregnancy success rate is not necessarily high in assisted reproductive technology and patient's mental and economical burdens are large. To solve this problem, a method for precisely judging a state of an embryo being cultured is sought for.

For example, in an embryo developed to a blastocyst stage, a cavity structure called a blastocoel cavity is created inside and a layer of cells called a trophectoderm covers around that cavity structure. The number of cells constituting the trophectoderm serves as an index for evaluating a state of the embryo. Therefore, a technique for counting that number in a non-invasive manner is required.

Conventionally, a doctor or embryologist generally evaluates whether or not embryo culture is satisfactorily in progress, for example, visually by microscopic observation. Veeck classification, Gardner classification and the like are, for example, widely used as a judgment index. However, these merely indicate rough judgment criteria for morphological characteristics of an embryo and final evaluation still depends on subjective judgment of an evaluator. Thus, a technique for enabling objective and quantitative evaluation is required.

It is, for example, known that an intestinal epithelium organoid constitutes a cell population with a cavity inside. If this is used as an evaluation model of a cell membrane transport system, it is ideal to form a cavity covered with one cell layer. However, multi-layers of cells are actually often formed around a cavity. Thus, a technique for quantitatively evaluating the structure of a cell layer on a surface of an intestinal epithelium organoid, specifically how cells form the cell layer covering the cavity is required.

The applicant of this application previously disclosed patent literature 1 and 2 as a technique expected to meet such a requirement. JP 2019-133429A (patent literature 1) describes a method for identifying and separating a trophectoderm and an inner cell mass from a three-dimensional image of an embryo (fertilized egg) captured by a non-invasive tomography imaging technique such as optical coherence tomography (OCT). Further, JP 2019-132710 (patent literature 2) describes a technique for visualizing an OCT-imaged embryo as a two-dimensional map. Specifically, a technique is described by which the embryo is represented by polar coordinates with a center-of-gravity position thereof as an origin and a reflected light intensity in each radial direction is replaced by a luminance value, thereby assisting an embryo evaluation operation by an observer.

The above conventional technique is for easily presenting a three-dimensional structure of an observation object to an observer. However, automatic extraction of quantitative information effective in assisting observation and evaluation has not yet been achieved. In this respect, the above conventional techniques have room for improvement. More specifically, a technique capable of obtaining quantitative information on a surface structure of a cell aggregate with a cavity inside such as an embryo in a blastocyst stage or an intestinal epithelium organoid is required.

Constituent elements in the embryo (fertilized egg) in the blastocyst stage serving as main evaluation objects include a zona pellucida besides the trophectoderm and inner cell mass described above. However, a technique for extracting a region corresponding to the zona pellucida is not mentioned in patent literature 1 and 2. Actually, the trophectoderm is distributed to adhere to the inside of the zona pellucida in the embryo and there is almost no difference in luminance information of the both in an OCT image. Thus, it is difficult to discriminate the trophectoderm and the zona pellucida from the OCT image.

As just described, a method for clearly distinguishing and handling a trophectoderm and a zone pellucida in an OCT image has not been established yet, and this point is not dealt with by the techniques described in patent literature 1 and 2 described above. From this, a technique capable of more accurately identifying a trophectoderm and a zona pellucida in an OCT image is required to provide useful information for users who want to individually evaluate these.

SUMMARY OF THE INVENTION

This invention was developed in view of the above problem and aims to provide a technique capable of obtaining quantitative information useful in the analysis of a surface structure of a cell aggregate from image data obtained by OCT imaging in image processing using an image of a cell aggregate with a cavity inside as a processing object. This invention aims, for example, to effectively assist an embryo evaluation operation by a user by identifying a trophectoderm and a zona pellucida using image data of an embryo obtained by OCT imaging.

One aspect of this invention is directed to an image processing method for an image of a cell aggregate with a cavity inside as a processing object. To achieve the above object, the image processing method comprises obtaining three-dimensional image data representing a three-dimensional image of the cell aggregate obtained by optical coherence tomography imaging of the cell aggregate, obtaining a thickness distribution representing a thickness of the cell aggregate between an outer surface of the cell aggregate facing an outside space and an inner surface thereof facing the cavity at each position based on the three-dimensional image data, and detecting protrusion parts having a prominent thickness as compared to a surrounding region based on the obtained thickness distribution.

Each cell has such a structure that a central part is swollen as compared to a peripheral edge part due to an internal structure of the cell such as a cell nucleus. Thus, in a cell layer formed by connecting cells to each other in a lateral direction, unevenness due to the shape of each cell is caused. Particularly, in a cell layer constituted by one layer of cells to cover a cavity inside as in an embryo (fertilized egg) in a blastocyst stage, protrusion parts corresponding one by one to the cells appear in this layer. Therefore, the number of the protrusion parts can be an index indicating the positions and the number of the cells constituting the layer. Further, intervals of the protrusion parts can be indices indicating the sizes of the individual cells.

In the above invention, the thickness distribution of the cell aggregate between the outer surface of the cell aggregate and the inner surface thereof facing the cavity inside is obtained from the three-dimensional image data of the OCT imaged cell aggregate. This thickness distribution can represent the thickness of the cell layer covering the cavity at each position. The thickness of the cell layer is not necessarily uniform. For example, in a cell layer constitute by one layer of cells, the individual cells are thick in central parts and thin in peripheral edge parts. Therefore, if the protrusion part having a larger thickness than the surrounding is detected from the obtained thickness distribution, it is said to be highly probable that this part indicates the position of one cell.

As just described, by obtaining the thickness distribution of the cell layer covering the cavity inside and detecting the protrusion parts included in the cell layer, information quantitatively representing the positions, the number, the sizes and the like of the cells constituting the cell layer can be obtained.

Further, one aspect of the invention is directed to an image processing method. To achieve the above object, the image processing method comprises obtaining three-dimensional image data obtained by optical coherence tomography imaging of a fertilized egg in a blastocyst stage and two-dimensional image data obtained by optical microscope imaging of the fertilized egg, specifying a structure region corresponding to a structure of the fertilized egg from the three-dimensional image data, specifying a region corresponding to a zona pellucida of the fertilized egg from the two-dimensional image data and obtaining an average thickness of the zona pellucida, and dividing the structure region into a region in a range of the average thickness from an outer edge toward inside of the structure region and other regions.

Although described in detail later, particularly an embryo (fertilized egg) in a blastocyst stage of a mammal has a substantially spherical outer shape, and a surface thereof is covered with a zona pellucida having a substantially constant thickness. A trophectoderm having a varying thickness depending on position is distributed to adhere to the inner surface of the zona pellucida. In a three-dimensional image of the embryo obtained by optical coherence tomography imaging, almost no luminance difference is seen between the trophectoderm and the zona pellucida. That is, in an OCT image, it is difficult to distinguish the trophectoderm and the zona pellucida merely by a luminance value.

Accordingly, in the invention, the trophectoderm and the zona pellucida can be distinguished in the OCT image by using both the OCT image and the optical microscope image. Specifically, the structure region corresponding to the structure of the embryo (fertilized egg) is specified from the OCT image. At this point of time, the trophectoderm, the zona pellucida and the inner cell mass need not be distinguished and regions occupied by certain solid structures in the three-dimensional image of the fertilized egg may be specified. Here, based on the knowledge that the thickness of the zona pellucida is substantially constant, a range of a certain distance from the outer edge toward the inside, out of the structure region specified from the OCT image, can be assumed to be occupied by the zona pellucida.

On the other hand, the thickness of the zona pellucida is estimated from the image obtained by the optical microscope imaging of the same fertilized egg. In the optical microscope image, the trophectoderm and the zona pellucida can be more easily identified based on a luminance difference than in the OCT image. Utilizing this, the thickness of the zona pellucida can be estimated from the optical microscope image.

From these pieces of information, the trophectoderm and the zona pellucida can be distinguished in the OCT image. That is, out of the three-dimensional image of the fertilized egg obtained by OCT imaging, a range starting from the outer edge of the three-dimensional image and corresponding to the thickness of the zona pellucida obtained from the optical microscope image can be regarded as a region occupied by the zona pellucida. On the other hand, out of the structures that cannot be distinguished from the zona pellucida in the OCT image, a region inside the range starting from the outer edge and corresponding to the thickness of the zona pellucida can be regarded as a region occupied by the trophectoderm.

As just described, the zona pellucida and the other structures can be distinguished by dividing the three-dimensional image of the fertilized egg obtained by OCT imaging into the region in the range of the thickness of the zona pellucida derived from the optical microscope image from the outer edge toward the inside of the structure region and other regions.

Further, another aspect of this invention is directed to a computer-readable recording medium which stores non-transiently a computer program for causing a computer to perform each of the above steps.

As described above, according to the invention, quantitative information on the positions, the number and the like of individual cells, which information is useful for the analysis of a surface structure of a cell aggregate, can be obtained from image data obtained by OCT imaging of the cell aggregate with a cavity inside. For example, a region occupied by a zona pellucida and other regions can be accurately identified in an OCT image of an embryo (fertilized egg) by combining information obtained from an OCT image and information obtained from an optical microscope image.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

FIG. 6 is a flow chart showing a process of selecting the image focused on the zona pellucida, and this processing content is equivalent to Step S104 of FIG. 3.

Further.

DETAILED DESCRIPTION OF THE PREFERRED EMBODIMENTS

Figure 1:
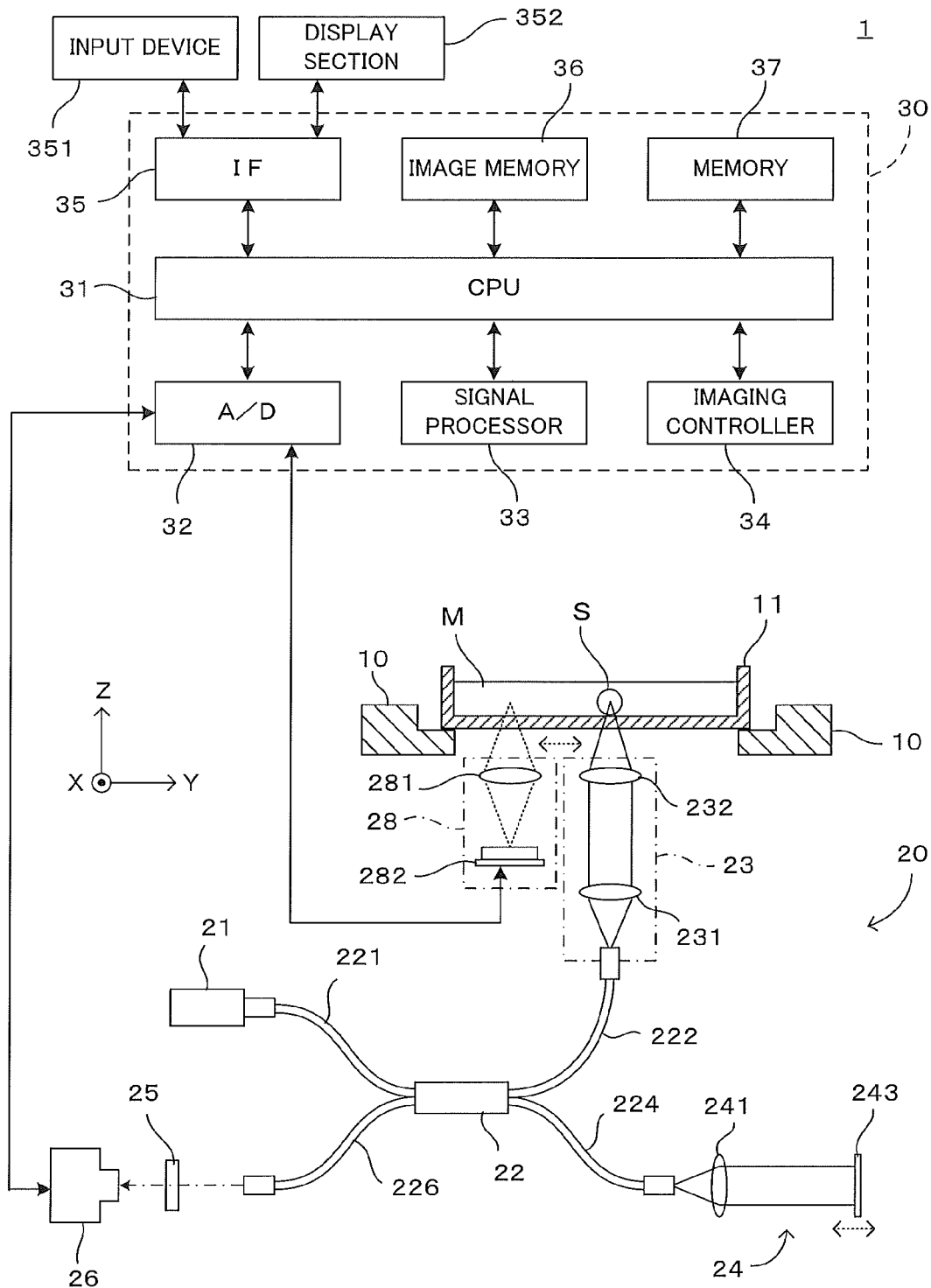
FIG. 1 is a diagram showing a schematic configuration of a preferred image processing apparatus as an execution subject of an image processing method according to the invention.

FIG. 1 is a diagram showing a schematic configuration of a preferred image processing apparatus as an execution subject of an image processing method according to the invention. This image processing apparatus 1 tomographically images a specimen carried in a liquid, e.g. an embryo (fertilized egg) cultured in a culture liquid. Then, the obtained tomographic image is processed to generate a cross-sectional image showing the structure of one cross-section of the specimen. Further, a three-dimensional image of the specimen is generated from a plurality of tomographic images. XYZ orthogonal coordinate axes are set as shown in FIG. 1 to indicate directions in the drawings. Here, an XY plane represents a horizontal plane. Further, the Z axis represents a vertical axis and, more particularly, a (-Z) direction represents a vertically downward direction.

The imaging apparatus 1 comprises a holder 10. The holder 10 holds in an approximately horizontal posture a container 11 storing a specimen S to be imaged. The container 11 is, for example, a shallow plate-like container having a flat bottom surface and called a "dish". The container may be a well plate having a plurality of well which are disposed to a top surface of a plate-like member and capable of storing liquid. A predetermined amount of an appropriate culture medium M such as culture liquid is poured in the container 11 in advance, and a specimen S is carried inside.

The imager 20 is arranged below the container 11 held by the holder 10. An OCT (Optical Coherence tomography) device capable of capturing a tomographic image of an imaging object in a non-contact and non-destructive (non-invasive) manner is used as the imager 20. As described in detail later, the imager 20, which is an OCT device, includes a light source 21 for generating illumination light to the imaging object, an optical fiber coupler 22, an objective optical system 23, a reference optical system 24, a spectrometer 25 and a photodetector 26.

The imager 20 further includes a microscopic imaging unit 28 for optical microscope imaging. More specifically, the microscopic imaging unit 28 includes an imaging optical system 281 and an imaging element 282. The imaging optical system 281 includes an objective lens, and the objective lens is focused on the sample S in the sample container 11. For example, a CCD imaging element, a CMOS sensor or the like can be, for example, used as the imaging element 282. The microscopic imaging unit 28 is preferably capable of bright field imaging or phase difference image. The objective optical system 23 and the microscopic imaging unit 28 are supported by a support member (not shown) movable in a horizontal direction and the positions thereof in the horizontal direction can be changed.

The image processing apparatus 1 further comprises a control unit 30 which controls an operation of the apparatus and a driving mechanism (not shown) which drives movable parts of the imager 20. The control unit 3 includes a CPU (Central Processing Unit) 31, an A/D convertor 32, a signal processor 33, an imaging controller 34, an interface (I/F) section 35, an image memory 36 and a memory 37.

The CPU 31 governs operations of the entire apparatus by executing a predetermined control program, thereby realizes various processing described later. The control program executed by the CPU 301 and data which are generated during processing are stored in the memory 37. The A/D convertor 32 converts signals which the photo-detector 26 and the imaging element 282 of the imager 20 output in accordance with the amount of received light into digital image data. The signal processor 33 performs image processing described later based upon a digital data outputted from the A/D converter 32, thereby generates various images such as the tomographic image and 3D image of the imaging object. The image memory 36 saves the image data thus generated.

The imaging controller 34 controls the imager 20 to execute imaging process. Specifically, the imaging controller 34 set the objective optical system 23 for tomographic imaging and the microscopic imaging unit 28 selectively to an imaging position where the specimen S is included in an imaging field of view. When the objective optical system 23 is positioned at the imaging position, the imaging controller 34 causes the imager 20 to execute an OCT imaging process described later for obtaining 3D image data indicating a solid structure of the specimen S. On the other hand, when the microscopic imaging unit 28 is positioned at the imaging position, the imaging controller 34 causes the imager 20 causes the microscopic imaging unit 28 to obtain 2D image data corresponding to a planar image of the specimen S formed on a receiving surface of the imaging element 282.

The interface section 35 realizes communication between the image processing apparatus 1 and outside. More specifically, the interface section 35 has a function of communicating with external equipment, and a user interface function of accepting manipulation by a user and informing the user of various types of information. For achieving these objects, the interface section 35 comprises an input device 351 and a display section 352. The input device 351 includes, for instance a key board, a mouse, a touch panel or the like which can accept manipulation and entry concerning selection of the functions of the apparatus, setting of operating conditions, etc. Further, the display section 352 includes a liquid crystal display for example which shows various types of processing results such as the tomographic images and the 3D images generated by the imager 20.

In the imager 20, from the light source 21 which includes a light emitting element such as a light emitting diode or a super luminescent diode (SLD) for instance, a low-coherence light beam containing wide-range wavelength components is emitted. For imaging the specimen such as cells or the like, an infrared light can be used favorably to make illumination light penetrate into the specimen.

The light source 21 is connected one optical fiber 221 of optical fibers constituting the optical fiber coupler 22. Low-coherence light emitted from the light source 21 is branched into lights to two optical fibers 222, 224 by the optical fiber coupler 22. The optical fiber 222 constitutes an object side optical path. More specifically, light emitted from an end part of the optical fiber 222 is incident on an objective optical system 23.

The objective optical system 23 includes a collimator lens 231 and an objective lens 232. Light emitted from an end part of the optical fiber 222 is incident on the objective lens 232 via the collimator lens 231. The objective lens 232 has a function of converging light (observation light) from the light source 21 to the specimen and a function of condensing reflected light from the specimen and causing the condensed reflected light toward the optical fiber coupler 22. Although a single objective lens 232 is shown in FIG. 1, a plurality of optical elements may be combined. Reflected light from the imaging object is incident as signal light on the optical fiber 222 via the objective lens 232 and the collimator lens 231. An optical axis of the objective lens 232 is orthogonal to the bottom surface of the container 11 and, in this example, an optical axis direction coincides with a vertical axis direction.

The CPU 31 sends a control command to the imaging controller 34. In response to the control command, the imaging controller 34 causes the imager 20 to move to a predetermined direction. More specifically, the imaging controller 34 makes the imager 20 move in a horizontal direction (XY direction) and a vertical direction (Z direction). By a movement of the imager 20 in the horizontal direction, the imaging field of view moves in the horizontal direction. Further, by a movement of the imager 20 in the vertical direction, a focus position of the objective optical system 23 along the optical axis direction changes relative to the specimen S as the imaging object.

Part of light incident on the optical fiber coupler 22 from the light source 21 is incident on the reference optical system 24 via an optical fiber 224. The reference optical system 24 includes a collimator lens 241 and a reference mirror 243. These constitute a reference system optical path together with the optical fiber 224. Specifically, light emitted from an end part of the optical fiber 224 is incident on the reference mirror 243 via the collimator lens 241. The light reflected by the reference mirror 243 is incident as reference light on the optical fiber 223.

The reference mirror 243 is supported by an advancing/retracting member (not shown). The advancing/retracting mechanism operates in response to a control command from the imaging controller 34, and includes an appropriate mechanism for advancing and retracting the reference mirror 243 in a Y direction, e.g. a linear motor or a ball screw mechanism. By moving the reference mirror 243 in Y direction, that is, a direction advancing to or retracting from the collimator lens 241, an optical path length of the reference light reflected by the reference mirror specimen 241 is adjusted.

The reflected light (signal light) reflected by a surface or an internal reflecting surface of the specimen and reference light reflected by the reference mirror 243 are mixed in the optical fiber coupler 22 and incident on the photo-detector 26 via the optical fiber 226. At this time, interference due to a phase difference between the reflected light and the reference light occurs, but an optical spectrum of interference light differs depending on a depth of the reflecting surface. That is, the optical spectrum of the interference light has information on a depth direction of the imaging object. Thus, a reflected light intensity distribution in the depth direction of the imaging object can be obtained by spectrally diffracting the interference light at each wavelength to detect a light quantity and Fourier transforming a detected interference signal. An OCT imaging technique based on such a principle is called Fourier domain OCT (FD-OCT).

The imager 20 of this embodiment is provided with a spectroscope 25 on an optical path of the interference light from the optical fiber 226 to the photo-detector 26. A spectroscope utilizing a prism, a spectroscope utilizing a diffraction grating and the like can be, for example, used as the spectroscope 25. The interference light is spectrally diffracted for each wavelength component and received by the photo-detector 26.

By Fourier-transforming the interference signal output from the photo-detector 26 according to the interference light detected by the photo-detector 26, the reflected light intensity distribution of the specimen in the depth direction, i.e. in the Z direction at the incident position of the illumination light is obtained. By scanning the illumination light incident on the container 11 in the X direction, the reflected light intensity distribution in a plane parallel to an XZ plane is obtained, with the result that a tomographic image of the specimen having this plane as a cross-section can be generated. A principle of generation of the tomographic image is not described because it is known.

Images are obtained by changing the incident position of the light along the Y direction over multiple steps and imaging a tomographic image for every change. By doing so, a number of tomographic images of the specimen are obtained along cross-sectional surfaces which are parallel to the XZ plane. As the scan pitch in the Y direction is reduced, it is possible to obtain image data with sufficient resolution to grasp the stereoscopic structure of the specimen. From these tomographic image data, 3D image data (voxel data) corresponding to a body of the specimen can be obtained.

As just described, this image processing apparatus 1 has a function of obtaining an image of the specimen S carried together with the culture medium M in the container 11. Obtainable images include two-dimensional image data obtained by optical microscope imaging, tomographic image data obtained by OCT imaging and three-dimensional image data based on the tomographic image data.

One embodiment of an image processing method according to the invention executable using the image processing apparatus 1 configured as described above is described below. Image processing in this embodiment includes individually extracting regions corresponding to a zone pellucida, a trophectoderm and an inner cell mass, which are main structures constituting an embryo, from an image captured by imaging a fertilized egg (hereinafter, merely referred to as the "embryo") in a blastocyst stage as the specimen S.

An embryo evaluation operation by a user (specifically, a doctor or embryologist) can be effectively assisted based on the data obtained in this way. For example, the image processing method of this embodiment can be applied for the purpose of obtaining knowledge for judging whether or not culture is satisfactorily in progress in embryo culture for the purpose of fertility treatment.

Figure 2A:
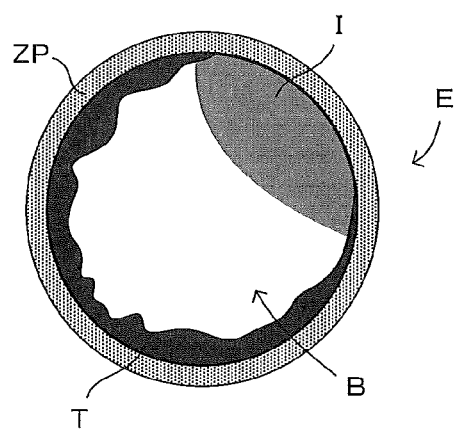
FIGS. 2A and 2B are diagrams schematically showing the structure of an embryo serving as a specimen in this embodiment.
Figure 2B:
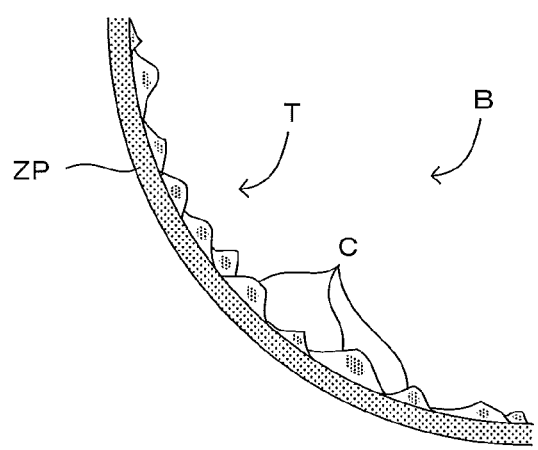

FIGS. 2A and 2B are diagrams schematically showing the structure of an embryo serving as a specimen in this embodiment. As already known, if an egg is fertilized, cleavage starts and a blastocyst is formed by way of a state called a morula. FIG. 2A schematically shows an internal structure of the embryo in the blastocyst stage. In the blastocyst stage, the embryo E has a cavity called a blastocoel cavity B. More specifically, cells with advanced cleavage are arranged side by side as a thin layer on a surface of the embryo form a trophectoderm T, and an internal space enclosed by the trophectoderm T forms the blastocoel cavity B. Further, an inner cell mass I in which a large number of cells are concentrated is formed in a part of the internal space.

Further, a zona pellucida ZP is formed to cover an outer surface of the trophectoderm T. The zona pellucida ZP is a membrane mainly composed of glycoprotein and having a substantially uniform thickness. On the other hand, the trophectoderm T formed by the aggregation of the large number of cells has a thickness varying depending on position and is distributed to adhere to the entire inner surface of the zona pellucida ZP. As shown in FIG. 2B, the trophectoderm T is formed by a large number of cells C arranged along the inner surface of the zona pellucida ZP. Since the shapes and sizes of the individual cells C differ, the trophectoderm T becomes a layer having a thickness varying depending on position. Note that a thickness variation of the trophectoderm T is emphasized more than an actual one in FIG. 2A.

These structures constituting the embryo E, i.e. the zona pellucida ZP, the trophectoderm T and the inner cell mass I are important as regions of interest in embryo evaluation. Thus, the technique for automatically extracting the regions corresponding to these structures from a captured image is of great significance in assisting the embryo evaluation operation by the user. However, there is almost no difference in luminance information among these structures in a tomographic image or three-dimensional image obtained by OCT imaging. Thus, it is difficult to accurately divide these structures by simple division based on luminance differences.

As just described, the technique for automatically separating the zona pellucida ZP, the trophectoderm T and the inner cell mass I from the OCT image has not established yet. In view of such a problem, the separation of regions corresponding to a trophectoderm and an inner cell mass from an OCT image is enabled in patent literature 2 previously disclosed by the applicant of this application. However, also in this technique, it cannot be said that the zona pellucida and the trophectoderm are clearly separated. Specifically, the region extracted as the trophectoderm by this technique possibly includes a region corresponding to the zona pellucida.

In the image processing in this embodiment, the zona pellucida ZP and the trophectoderm T are separated by analyzing an OCT image utilizing information obtained from a two-dimensional image obtained by optical microscope imaging. A first object is to individually specify regions occupied by the zona pellucida ZP, the trophectoderm T and the inner cell mass I in the three-dimensional image. A second object is to find out the number of the cells constituting the trophectoderm T separated in this way.

In a bright field image or phase difference image obtained by optical microscope imaging, it is possible to distinguish the zona pellucida ZP and the trophectoderm T due to differences in luminance and texture. In the satisfactorily cultured embryo in the blastocyst stage, the zona pellucida ZP has a substantially uniform thickness. In other words, the zona pellucida ZP can be thought to occupy a region of the embryo from a surface of the embryo to a certain depth. From these, the thickness of the zona pellucida ZP can be specified from two-dimensional image data obtained by optical microscope imaging. By specifying a region up to a depth corresponding to the thickness of the zona pellucida ZP from the surface of the embryo E from three-dimensional image data obtained by OCT imaging, the region corresponding to the zona pellucida ZP can be extracted separately from the trophectoderm T. Further, the method described in patent literature 2 can be, for example, applied for the separation of the inner cell mass I. The first object can be achieved by these.

The trophectoderm T separated from the other structures in this way has unevenness due to the shapes of the individual cells C as shown in FIG. 2B. More specifically, protrusions due to the shapes of the individual cells C are formed on a surface of the trophectoderm T facing the blastocoel cavity B. Thus, if such protrusion parts are detected and the number thereof is counted, the number of the cells C constituting the trophectoderm T can be known. In this way, the second object is achieved.

Figure 3:
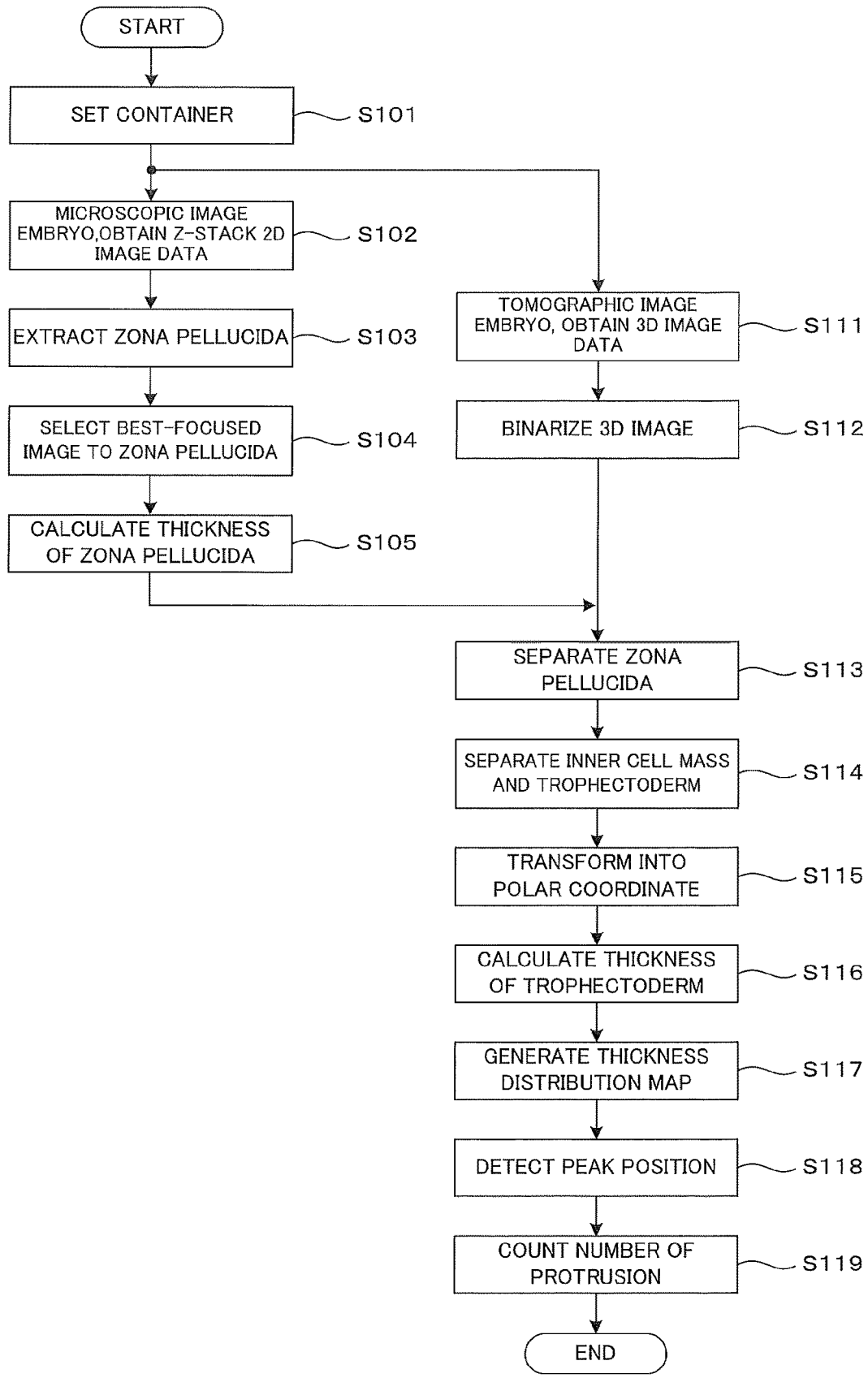
FIG. 3 is a flow chart showing the image processing in this embodiment.

FIG. 3 is a flow chart showing the image processing in this embodiment. This processing is realized by the CPU 31 executing a control program prepared in advance and causing each component of the apparatus to perform a predetermined operation. If the container 11 storing an embryo to be evaluated is set in the holder 10 (Step S101), optical microscope imaging and OCT imaging are performed by the imager 20 using this embryo as an object to be imaged.

In FIG. 3, Steps S102 to S105 represent optical microscope imaging and data processing using two-dimensional image data obtained by optical microscope imaging. On the other hand, Steps S111 and S112 represent OCT imaging and image processing using three-dimensional image data obtained by OCT imaging. These two processings may be performed one after the other in a time-series manner. In this case, which of the processings is first performed is arbitrary. Further, a processing time may be shortened by performing these processings in parallel.

First, a process of Steps S102 to S105 is summarized. In this process, the two-dimensional image data of the embryo is obtained by optical microscope imaging of the embryo and a thickness of a zona pellucida is calculated based on the image data. Specifically, the microscopic imaging unit 28 is positioned at an imaging position, a focus position is changed and set in a multi-step manner in a depth direction (Z direction), and imaging is performed every time. In this way, a set including a plurality of two-dimensional images having mutually different focus depths, i.e. so-called Z stack images, are obtained (Step S102).

A region corresponding to the zona pellucida ZP is extracted from each of these images (Step S103). Out of the plurality of images, one image best focused on the zona pellucida ZP is selected (Step S104). A thickness of the zona pellucida ZP is calculated based on the selected image (Step S105). These processings, i.e. the processing of extracting the region corresponding to the zona pellucida ZP (Step S103), the processing of selecting the best focused image (Step S104) and the processing of calculating the thickness of the zona pellucida ZP (Step S105) are described in detail later. The thickness of the zona pellucida ZP in the embryo E to be evaluated becomes known by the process thus far.

On the other hand, in Step S111, the objective optical system 23 is positioned at an imaging position and the embryo E is tomographically imaged while the imaging position is scanned. In this way, three-dimensional image data of the embryo E is obtained. A luminance of each part represented by the three-dimensional image data is binarized using a predetermined threshold value (Step S112). In this way, the three-dimensional image of the embryo E is divided into regions having a high luminance by being occupied by certain structures having a relatively high density (hereinafter, called "structure regions") and a region having lower density and luminance than the structure region. For example, the culture medium M has a low luminance in the OCT image.

The structures occupying the structure regions possibly include the zona pellucida ZP, the trophectoderm T and the inner cell mass I as described above. In Steps S113 and S114, these are separated from one another. Specifically, in Step S113, the region corresponding to the zona pellucida ZP is separated from the other structure regions. Then, in Step S114, the trophectoderm T and the inner cell mass I are separated.

By the process thus far (Steps S101 to S114), the first object of specifying each of the regions occupied by the zona pellucida ZP, the trophectoderm T and the inner cell mass I from the three-dimensional image of the embryo E is achieved. A subsequent process of Steps S115 to S118 is for achieving the second object of counting the number of the cells constituting the separated trophectoderm T. The process for this is described in detail later.

Elemental techniques for performing each Step (Steps S103 to S105, S111) of the above process are successively and separately described. Note that since the processing of obtaining the Z stack images of Step S102 is known, description is omitted. Further, the description of the processing of Step S114 is omitted since the technique described in patent literature 2 is applicable.

In Step S103, the region corresponding to the zona pellucida ZP is extracted from the two-dimensional image data obtained by optical microscope imaging of the embryo E. This processing can be performed using an appropriate image processing technique. For example, a pattern recognition technique for extracting a region having a specific characteristic from an image can be applied. Specifically, a classification model is constructed by supervised learning using an image of a zona pellucida obtained in advance as a teacher image, and an optical microscope image of the embryo E to be evaluated is divided into regions using this model. By doing so, the region corresponding to the zona pellucida ZP can be extracted from the image.

A known semantic segmentation method can be, for example, used as a specific example of a region division processing. The semantic segmentation method is a technique for labelling each pixel in an image, using a classification model constructed in advance by a deep learning algorithm. In this embodiment, this method can be utilized as follows.

First, a user prepares an optical microscope image of an embryo having a zona pellucida imaged with good image quality, and each pixel of a region corresponding to the zona pellucida in the image is labeled to that effect. Then, deep learning is performed using the original optical microscope image as input data and the labeled image as ground truth data, whereby the classification model is constructed. If an unknown image is given as input data to the classification model constructed in advance in this way, it is possible to obtain an output image by labeling a region of the input image corresponding to the zona pellucida to that effect. By extracting such a region from the output image, the zona pellucida can be extracted as a result.

Figure 4:
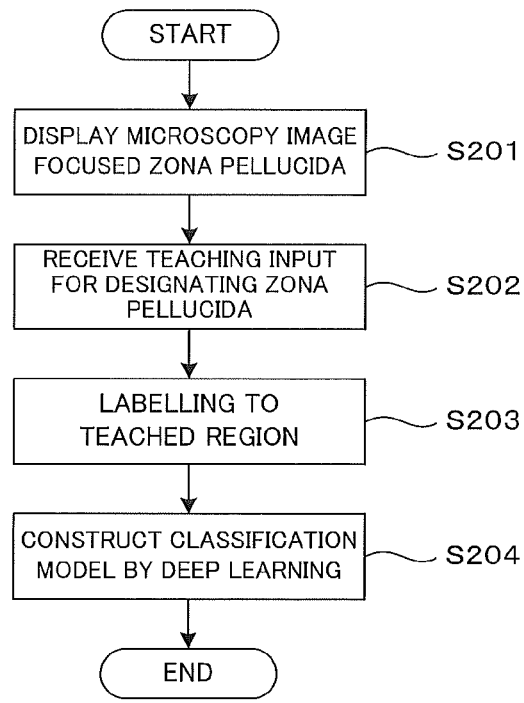
FIG. 4 is a flow chart showing an example of a specific method for constructing the classification model.

FIG. 4 is a flow chart showing an example of a specific method for constructing the classification model. This process can be performed by various computer devices having a function of displaying an image and a function of receiving an operation input from a user. For example, this process can be performed by the image processing apparatus 1 or a general-purpose computer device such as a personal computer.

At first, an optical microscope image of the embryo captured in advance with the zona pellucida set in focus (focused) is displayed (Step S201). In the image processing apparatus 1, this image can be displayed on the display 352. A teaching input from the user for designating a region corresponding to the focused zona pellucida for the image displayed in this way is received (Step S202). The user in this case is desirably a skilled person having sufficient knowledge on embryo images. Further, in the case of using the image processing apparatus 1, the teaching input can be received via the input device 351.

To the region designated as the zona pellucida, a label indicating that effect is given (Step S203). Deep learning is performed with the thus labeled image as ground truth data and the original image as input data. By doing so, the classification model for extracting the zona pellucida from the image is constructed (Step S204). If necessary, a label other than for the zona pellucida may also be used.

This classification model is constructed by using the image focused on the zona pellucida as an input image. Thus, if the semantic segmentation method is performed by applying this model to an unknown test image, a region having a strong characteristic as the zona pellucida is extracted from the test image. If the zona pellucida is extracted in this way, a thickness thereof can be calculated. To accurately calculate the thickness, the zona pellucida is desirably in focus in a maximally large region in the image. That is, it is said that the image having a maximally large area of the region extracted by the semantic segmentation method is desirable for calculation of the thickness of the zona pellucida. Note that the area can be expressed, for example, by a pixel number.

On the other hand, the embryo E to be evaluated has a three-dimensional structure. Thus, in an image captured with a focus depth determined roughly, a focused state on the zona pellucida ZP may not necessarily be satisfactory. Accordingly, one image having a largest area of the region extracted as the one equivalent to the zona pellucida ZP is selected from the Z stack images obtained with the focus position varied in the depth direction (Z direction). Then, this image is used to calculate the thickness of the zona pellucida ZP.

In Step S104, the image best focused on the zona pellucida ZP is selected from the Z stack images. In the semantic segmentation method in this embodiment, the region of the focused zona pellucida is extracted from the image. From this, it is said to be highly probable that the image having a largest area of this region is the image best focused on the zona pellucida ZP. The image falling under such conditions may be selected.

Figure 5A:
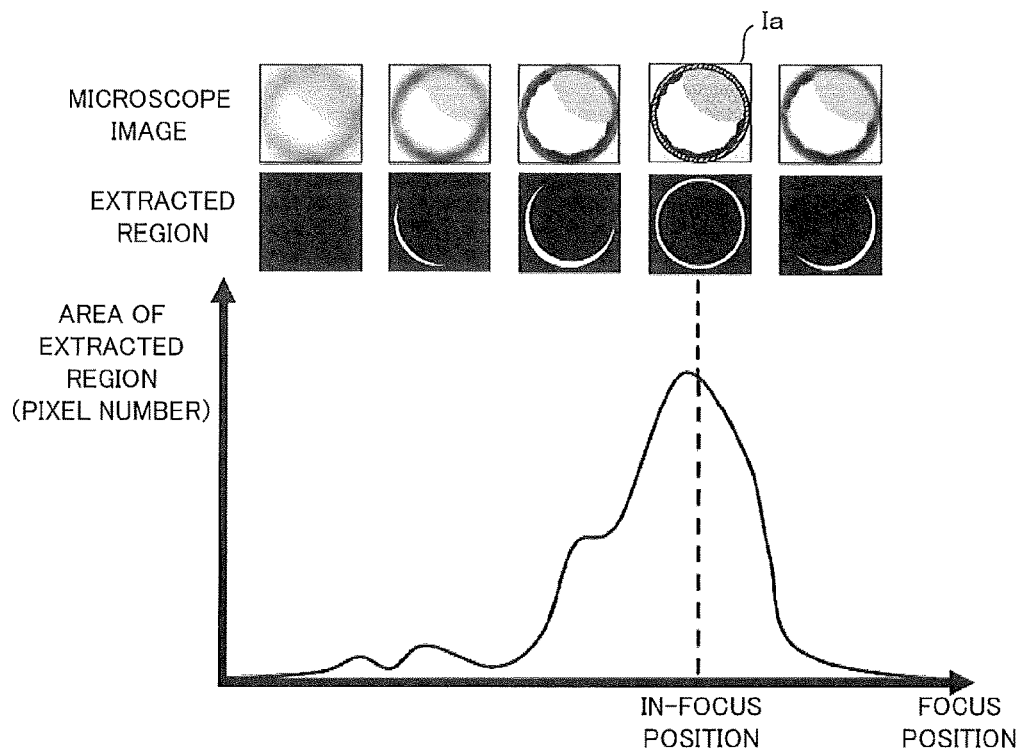
FIGS. 5A and 5B are graphs showing a relationship of the focus depth and the area of the zona pellucida to be extracted.
Figure 5B:
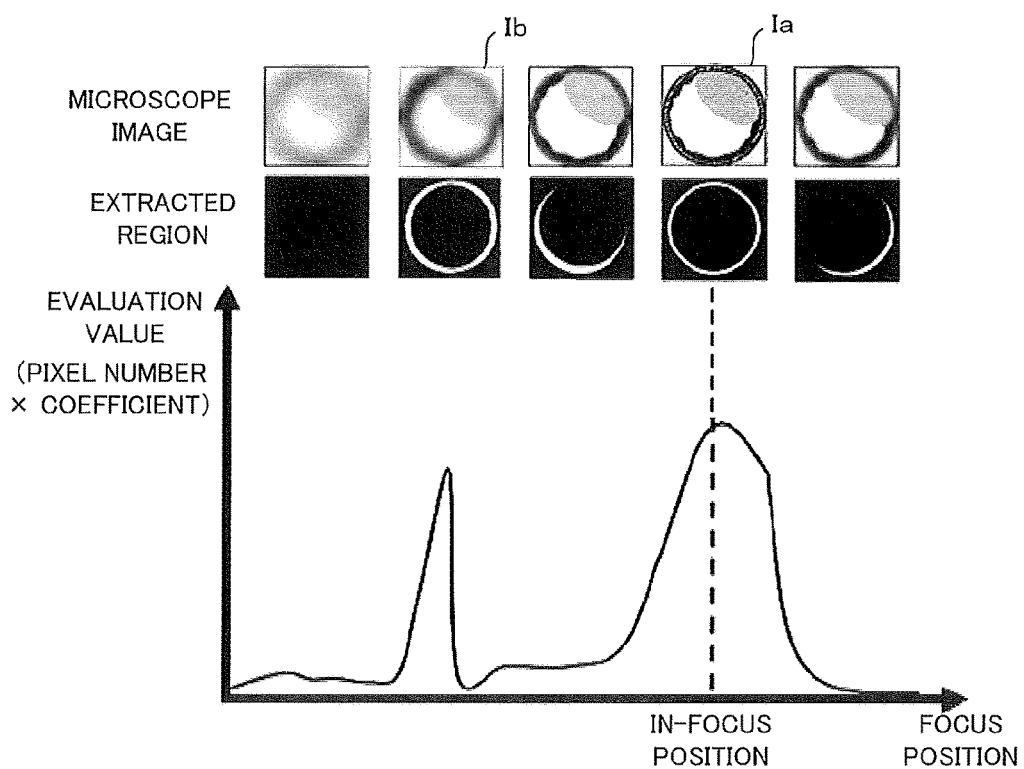

FIGS. 5A and 5B are graphs showing a relationship of the focus depth and the area of the zona pellucida to be extracted. A relationship of optical microscope images (Z stack images) captured at various focus positions in the depth direction and regions (regions equivalent to the zona pellucida ZP) extracted by the semantic segmentation method from those images is schematically shown in an upper part of FIG. 5A. Further, a relationship of the focus position at the time of imaging and the area of the extracted region (pixel number) is illustrated in a graph in a lower part of FIG. 5A. As shown in these, the area of the region to be extracted is largest in an image Ia best focused and clearly showing the zona pellucida ZP, out of the Z stack images. In other words, the focus position corresponding to the image having a largest area of the extracted region, out of the Z stack images, can be regarded as an in-focus position. Thus, this image Ia may be selected as the image, based on which the thickness of the zona pellucida ZP is calculated.

However, an image may be blurred, for example, due to vibration at the time of imaging and, as a result, an apparent area of a zona pellucida possibly appears to be larger than an actual area. FIG. 5B shows such a situation. For example, it is assumed that an image blur due to vibration is seen in an image Ib. Then, an area extracted to be equivalent to the zona pellucida may appear to be large and this position may be erroneously determined as an in-focus position.

In this embodiment, this problem is solved by using a luminance difference between pixels sandwiching a peripheral edge part of the extracted region. That is, in a well-focused image, a boundary between the region corresponding to the zona pellucida and a surrounding region thereof is clear and, accordingly, a sharp contrast is thought to be present between luminances of those regions. On the other hand, in an unfocused image, a boundary between these regions is not clear and, accordingly, a contrast is also not sharp.

From this, an evaluation value also reflecting the magnitude of a luminance change in an edge part of the extracted region, i.e. sharpness, is introduced instead of evaluation simply based on the size of the area (pixel number) of the extracted region. By doing so, the erroneous determination as described above is thought to be possibly reduced. Various methods for quantitating such an edge change amount are available and one of them can be selected and applied as appropriate.

In this embodiment, for example, a value obtained by multiplying the area of the extracted region by a coefficient reflecting the magnitude of a luminance change in an edge part is used as an evaluation value. A value obtained by squaring a luminance difference between pixels on both sides of the edge can be used as this coefficient. More specifically, a difference between an average value of luminances of all the pixels adjacent to the edge, out of the extracted region, and an average value of luminances of all the pixels adjacent to the edge outside the edge is obtained, and the above coefficient is obtained by squaring the obtained difference.

By doing so, a peak becomes clearer as shown in the graph in the lower part of FIG. 5B and a risk of causing the erroneous determination of the in-focus position by an increase of the extracted area due to a deviation in the image Ib can be reduced. Note that although the luminance difference is squared to make the coefficient a positive value, an absolute value of the luminance difference may be used as the coefficient instead.

FIG. 6 is a flow chart showing a process of selecting the image focused on the zona pellucida, and this processing content is equivalent to Step S104 of FIG. 3. The region corresponding to the zona pellucida is extracted in Step S103 for each image constituting the Z stack images. To obtain the area of the region extracted in this way, the number of pixels belonging to this region is counted for each image (Step S301). Then, average luminances of the adjacent pixels inside and outside an edge of the extracted region are obtained and a difference therebetween is calculated (Step S302). An evaluation value indicating a focusing degree of each image is calculated based on these values (Step S303). Specifically, the evaluation value is calculated by multiplying the pixel number of the extracted region by a coefficient expressed by a square of the luminance difference between the inside and outside of the edge. The image having a largest evaluation value obtained in this way is selected as the image best focused on the zona pellucida.

Subsequently, the processing content of Step S105 to calculate the thickness of the zona pellucida ZP from one optical microscope image selected from the Z stack images is described. The region equivalent to the zona pellucida ZP is extracted in Step S103 for the selected image. In the satisfactorily cultured embryo E, a ring-shaped region having a substantially constant width is thought to be extracted as the region equivalent to the zona pellucida ZP. In the image focused on the zona pellucida ZP, the width of this ring, i.e. a distance between an inner edge and an outer edge of this ring, corresponds to the thickness of the zona pellucida ZP.

Various methods for obtaining a width of a ring are considered. A method, for example, utilizing a "Distance Transform" function provided in an open CV (Open Source Computer Vision) library is known as a simple method. By applying the Distance Transform function, using one pixel on the inner edge of the ring as a target pixel, a distance from this pixel to the closest pixel on the outer edge of the ring can be specified. This distance represents the width of the ring at that position, i.e. the thickness of the zona pellucida ZP. The calculation of a shortest distance from a pixel on the outer edge of the ring serving as a target pixel to the inner edge, on the contrary, is equivalent. An average value of the widths obtained at the respective positions on the ring can be an average value of the thickness of the zona pellucida ZP. An average value of the thickness is denoted by Tav below.

The detailed processing contents of Steps S103 to S105 are described above. Next, the processing of separating the zona pellucida in Step S113 is described. Here, a range from an outer surface to a depth Tav, out of a three-dimensional image of the embryo E obtained by OCT imaging, is regarded as the zona pellucida ZP. Accordingly, only the structure corresponding to the zona pellucida ZP can be taken out by extracting only this range from the three-dimensional image. On the other hand, by deleting the structure in this range from the three-dimensional image, the structures other than the zona pellucida ZP, i.e. the trophectoderm T and the inner cell mass I, can be taken out.

For the three-dimensional image having the region corresponding to the zona pellucida ZP deleted therefrom, the region division processing utilizing, for example, a local thickness calculation is performed for the remaining structures as described in patent literature 2. By doing so, the region corresponding to the trophectoderm T and the region corresponding to the inner cell mass I can be separated. In this way, the regions respectively occupied by the zona pellucida ZP, the trophectoderm T and the inner cell mass I can be individually extracted from the three-dimensional image of the embryo E.

Figure 7A:
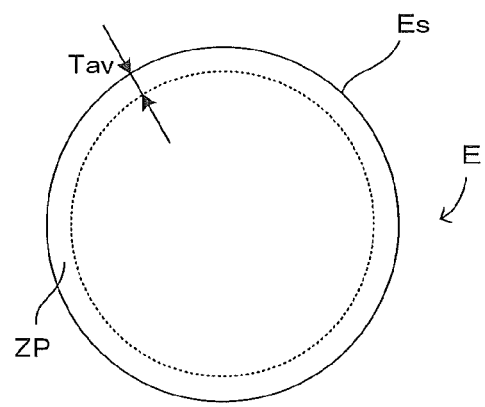
FIGS. 7A and 7B are diagrams schematically showing a state of region division in this embodiment.
Figure 7B:
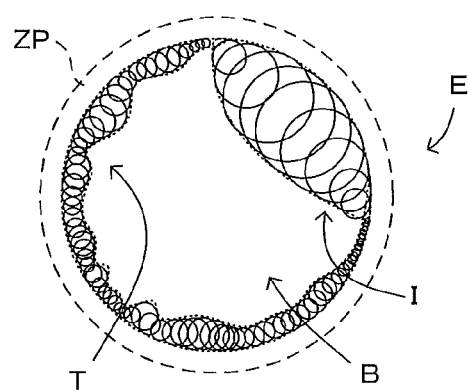

FIGS. 7A and 7B are diagrams schematically showing a state of region division in this embodiment. Here, the embryo E is expressed as a two-dimensional image to facilitate the understanding. However, this is actually a processing for the three-dimensional image obtained by OCT imaging. As shown in FIG. 7A, a region included in a range of the thickness Tav from a surface Es of the image of the embryo E is regarded as the region equivalent to the zona pellucida ZP.

Further, as shown in FIG. 7B, when the local thickness calculation is performed for the three-dimensional image of the embryo E having the region equivalent to the zona pellucida ZP deleted therefrom, a region expressed as an aggregate of relatively small spheres is treated as the trophectoderm T and a region expressed as an aggregate of larger spheres is treated as the inner cell mass I. This distinction can be realized, for example, as follows. That is, an appropriate threshold value is set for a radius of an inscribed sphere generated by the local thickness calculation. Then, the region expressed by spheres having radii smaller than this threshold value is regarded as the trophectoderm T. On the other hand, the region expressed by spheres having radii larger than the threshold value is regarded as the inner cell mass I.

If each region separated in this way needs to be further subdivided, region division, for example, by the watershed method may be performed for each region after separation as described in patent literature 2.

As just described, the zona pellucida can be separated from the other structures, out of the structures constituting the embryo, particularly, from the trophectoderm having a little luminance difference from the zona pellucida in the OCT image, utilizing the information obtained from the three-dimensional image data obtained by OCT-imaging of the embryo (fertilized egg) in the blastocyst stage and the two-dimensional image data obtained by optical microscope imaging of the same embryo. Specifically, the average thickness of the zona pellucida is calculated from the optical microscope image in which a texture difference tends to appear between the zona pellucida and the trophectoderm, and the region in the range of the average thickness from the surface of the structure in the three-dimensional image is regarded as the region occupied by the zona pellucida. Utilizing a knowledge that the thickness of the zona pellucida is substantially uniform, the regions are separated by reflecting the information on the thickness of the zona pellucida obtained from the optical microscope image on the three-dimensional image. By doing so, the zona pellucida and the trophectoderm can be accurately separated.

Next, the process (Steps S115 to S119 of FIG. 3) for achieving the second object of this embodiment, i.e. counting the number of the cells constituting the trophectoderm T is described. A rough flow of this process is the calculation of a thickness distribution of the trophectoderm T at each position, the detection of peak positions in the calculated thickness distribution and the counting of the peaks, assuming that significant peaks correspond to the individual cells. The respective steps are successively described below.

In Step S115, the three-dimensional image data represented by an XYZ orthogonal coordinate system is transformed into polar coordinate representation. Since the embryo E is substantially spherical and hollow inside, the trophectoderm T has a shape close to a spherical shell. Each position is preferably represented by polar coordinates (spherical coordinates) using a center of the embryo E as an origin to more simply represent such a structure. Accordingly, coordinate transform is performed from the XYZ orthogonal coordinate system into a $r\theta\phi$ polar coordinate system using one radius r and two angles of deviation $\theta$, $\phi$ as coordinate variables as shown in FIG. 8.

Figure 8:
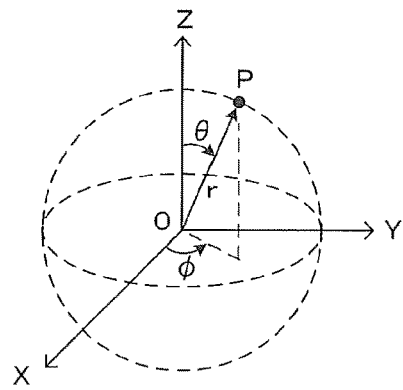
FIG. 8 is a graph showing a correspondence relationship of the XYZ orthogonal coordinate system and the r$\theta\phi$ polar coordinate system.

FIG. 8 is a graph showing a correspondence relationship of the XYZ orthogonal coordinate system and the $r\theta\phi$ polar coordinate system. As well known, the following relationships are satisfied between coordinates (x, y, z) of a point P in the orthogonal coordinate system and coordinates (r, $\theta$, $\phi$) of the point P in the $r\theta\phi$ polar coordinate system if an origin O is common:

$$x = r \sin\theta \cos\phi$$

$$y = r \sin\theta \sin\phi$$

$$z = r \cos\theta.$$

Specifically, a center position of the embryo E is specified from the three-dimensional image data and set as the origin O of the polar coordinate system. This origin O needs not coincide with an origin of the XYZ orthogonal coordinate system. Then, a coordinate transform is performed from the orthogonal coordinates into the polar coordinates by an appropriate transform process. By performing the coordinate transform in this way, each point in a three-dimensional space specified by the XYZ orthogonal coordinate system can be represented by the polar coordinates.

The "center of the embryo" can be obtained, for example, as follows based on the three-dimensional image data. If the surface of the three-dimensional image of the embryo E represented by the three-dimensional image data is regarded as a spherical surface, a center of gravity of this sphere in the image can be set as the center of the embryo. In three-dimensional image processing, a method for calculating a center of gravity of a solid object is known and such a method can be applied. Further, a spherical surface or spheroidal surface approximately representing the surface of the embryo may be specified and a center derived from this approximate surface may be set as the center of the embryo.

In Step S116, the thickness distribution of the trophectoderm T is obtained from the three-dimensional image data transformed into polar coordinates in this way. Specifically, the thickness distribution of the trophectoderm T can be obtained by calculating the thickness of the trophectoderm T in one radial direction in a polar coordinate space and performing this calculation for various radial directions.

Figure 9A:
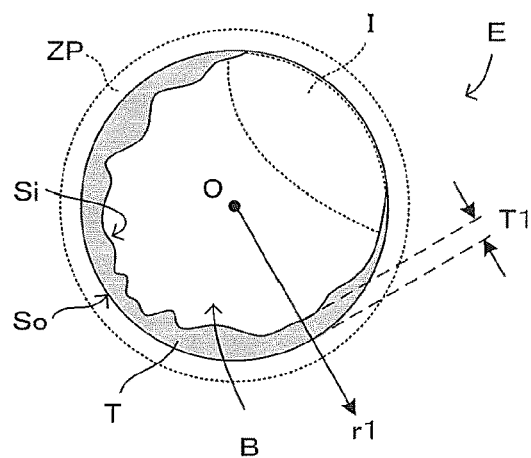
FIGS. 9A and 9B are diagrams illustrating how to obtain the thickness of the trophectoderm.
Figure 9B:
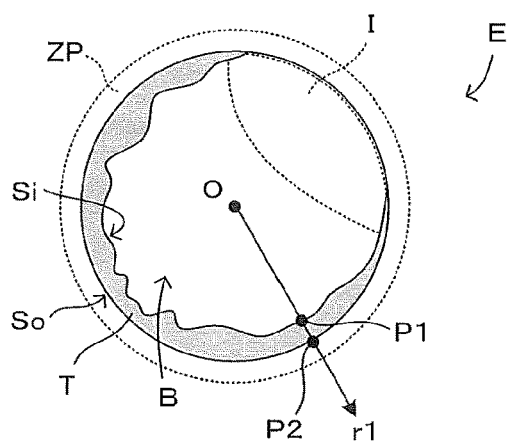

FIGS. 9A and 9B are diagrams illustrating how to obtain the thickness of the trophectoderm. In an example shown in FIG. 9A, one radius r1 extending from the origin O is considered. A distance T1 between the inner surface of the trophectoderm T, i.e. a surface Si facing the blastocoel cavity B, and the outer surface, i.e. a surface So facing the zona pellucida ZP, in a direction of this radius r1 is set as the thickness of the trophectoderm T in this radial direction.

Further, in an example shown in FIG. 9B, a point P1 where the radius r1 intersects the inner surface Si of the trophectoderm T is focused. A shortest distance between this point P1 and the outer surface So of the trophectoderm T is set as the thickness of the trophectoderm T in the direction of this radius r1. Alternatively, a point P2 where the radius r1 intersects the outer surface So of the trophectoderm T may be focused and a shortest distance between this point P2 and the inner surface Si of the trophectoderm T may be set as the thickness of the trophectoderm T in the direction of this radius r1. The Distance Transform function in the open CV library can be utilized, similarly to the calculation process of the thickness of the zona pellucida ZP described above.

Figure 10:
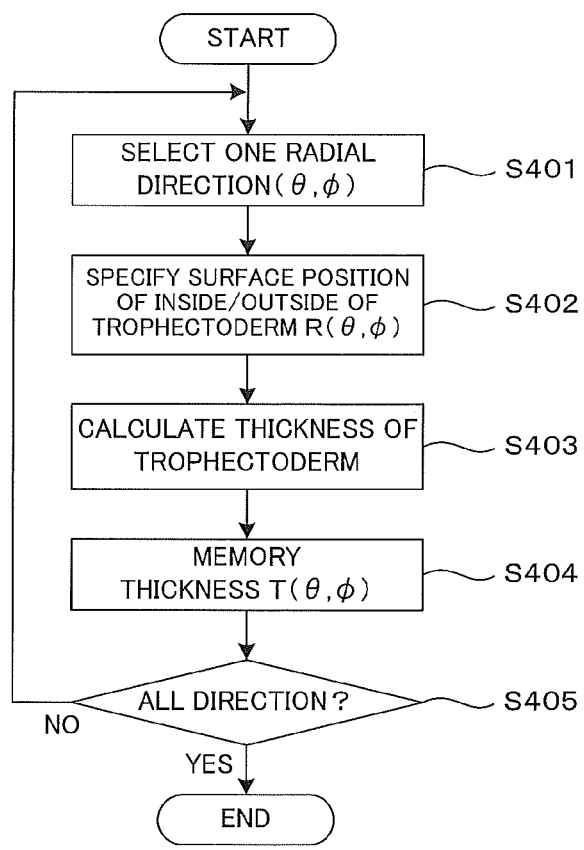
FIG. 10 is a flow chart showing a process of obtaining the thickness of the trophectoderm.

FIG. 10 is a flow chart showing a process of obtaining the thickness of the trophectoderm. At first, one radial direction is selected (Step S401). Specifically, the values of the angles of deviation $\theta$, $\phi$ are appropriately temporarily set, whereby the one radial direction is specified. Subsequently, a pixel corresponding to the position of the inner surface Si of the trophectoderm T (position of the point P1 shown in FIG. 9B) or the position of the outer surface So (position of the point P2 shown in FIG. 9B) in this radial direction in the polar coordinate space is specified as a target pixel (Step S402). For later processings, a distance from the origin O to the target pixel is desirably stored in association with the radial direction specified by a pair of the angles of deviation θ, φ. Information representing this distance is represented by a function R(θ, φ).

Subsequently, the distance between the inner surface Si and the outer surface So of the trophectoderm T in this radial direction, i.e. the thickness of the trophectoderm T, is obtained (Step S403). The thickness can be obtained, for example, by either one of methods shown in FIGS. 9A and 9B.

The thickness of the trophectoderm T obtained in this way is associated with one radial direction and, accordingly, can be represented as a function of the angles of deviation θ, φ. Hereinafter, the thickness of the trophectoderm T in one radial direction specified by the pair of the angles of deviation θ, φ is represented by T(θ, φ). The obtained thickness T(θ, φ) is stored and saved in the memory 37 (Step S404). By repeating the above process for various radial directions (Step S405), a thickness distribution representing the thickness of the trophectoderm T in each direction can be obtained.

In Step S117 of FIG. 3, a map representing a spatial distribution of the thicknesses of the trophectoderm T obtained in this way is generated. A two-dimensional map and a three-dimensional map can be thought as thickness distribution maps. Further, for the two-dimensional map, a method for accommodating all directions in one map and a method for dividing the polar coordinate space into several spaces and accommodating these spaces one by one in maps are thought. Specific examples of these mapping methods are described below.

Figure 11A:
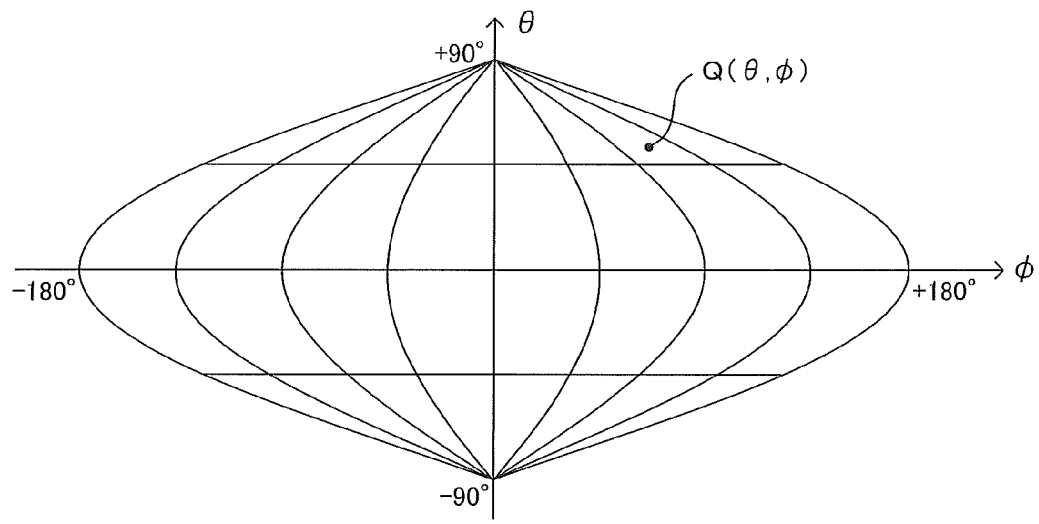
FIGS. 11A and 11B are graphs showing an example of the two-dimensional mapping method.
Figure 11B:
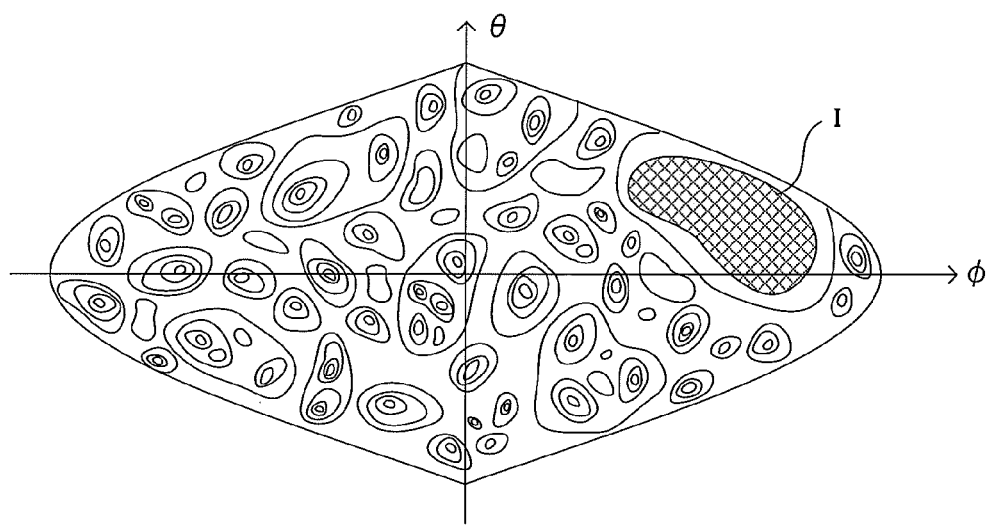

FIGS. 11A and 11B are graphs showing an example of the two-dimensional mapping method. To map each direction represented by polar coordinates on a two-dimensional plane, a pseudo-cylindrical projection can be, for example, used. That is, assuming the angles of deviation θ, φ to be respectively equivalent to a latitude and a longitude as shown in FIG. 11A, a projection similar to the one in the case of representing landforms on the earth surface, which is a substantially spherical body, on a plane map. Several such projections are known and an appropriate one can be selected according to a purpose.

Here, Sanson projection, which is a map projection capable of maintaining areas of substances on a map, is used, treating the angle of deviation θ as a latitude and the angle of deviation φ as a longitude. A pixel having a luminance value corresponding to the thickness T (θ, φ) of the trophectoderm T calculated in each radial direction is arranged at each point on the map specified by a combination of the angles of deviation (θ, φ). The thickness distribution can be visualized by representing the thickness in each direction on the map in this way. FIG. 11B shows the map representing the thickness of the trophectoderm T by the luminance, using isoluminance contours instead of direct representation by luminances. This map is said to merely represent the thickness in each direction by a contour line. Besides, the thickness of the trophectoderm T can also be represented by color or shading.

Note that a hatched region on a right-upper side in FIG. 11B represents a region where the inner cell mass I is present. The trophectoderm T is present also between the inner cell mass I and the zona pellucida ZP, but the shape of a surface in contact with the inner cell mass I does not necessarily represent the shapes of the individual cells. Thus, in this embodiment, the region where the inner cell mass I is present is excluded from an object from which the thickness distribution is derived.

As it is problematic also in the case of geographic map generation, all pieces of information cannot be correctly represented if a surface of a substantial sphere is represented by two-dimensional mapping. For example, in the case of Sanson projection, which is one type of equal-area pseudo-cylindrical projections, areas of land surfaces can be correctly represented, but distances and directions cannot be necessarily correctly represented. In the case of mapping of this embodiment, a peripheral part of a map plane is particularly largely distorted.

Figure 12A:
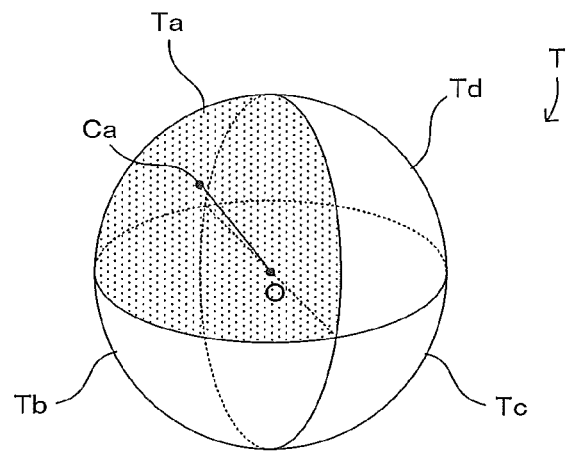
FIGS. 12A and 12B are drawings showing another example of the two-dimensional mapping method.
Figure 12B:
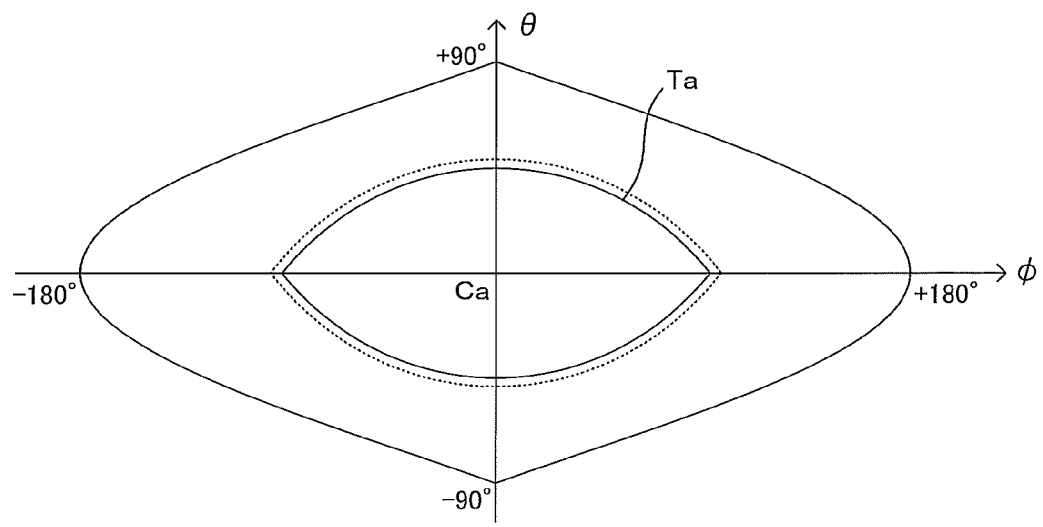

FIGS. 12A and 12B are drawings showing another example of the two-dimensional mapping method. As shown in FIG. 12A, a three-dimensional image of the trophectoderm T represented as a substantially spherical surface in the polar coordinate space is divided into four by two planes passing through the origin O and perpendicular to each other. Then, each of divided sections Ta to Td is represented on one map. At this time, an intersection Ca of a straight line passing through a center of the sectioned spherical surface, more specifically the origin O, and intersecting each of the two planes at an angle of 45° and the spherical surface is located substantially in a center in the map corresponding to the section Ta. The same applies also to the other sections Tb, Tc and Td.

By doing so, the trophectoderm T divided into four in the polar coordinate space is represented, using only central parts of map planes as shown in FIG. 12B. Thus, there are four maps. In each map, the thickness distribution in the entire trophectoderm T can be more accurately represented without using a peripheral edge part where distortion is large.

Note that, in reality, it is more preferred that the respective sections are partially overlapped in considering the division of the spherical surface corresponding to the trophectoderm T and the thickness distribution is shown not only in the section Ta, but also in a certain range outside the section Ta as shown by a dotted line in FIG. 12B. The reason for that is as follows. Although division is made for the convenience of mapping, the actual trophectoderm T is continuous to a range outside each section. By performing mapping up to the certain range outside the section, the continuity of the thickness distribution on the outer edge of each section can be represented.

In this sense, it is also considered to generate a plurality of two-dimensional maps having centers at different positions and use only central parts of these maps, instead of performing division. Further, a division number is also arbitrary without being limited to four described above.

The two-dimensional mapping method as described above is, for example, suitable for such an application as to overlook the entire thickness distribution on a screen or print paper. However, an accuracy reduction in a peripheral edge part is unavoidable. Thus, three-dimensional mapping is better in terms of accuracy. In three-dimensional mapping, nearly equal accuracy can be ensured in all the directions in the polar coordinate space.

When a three-dimensional map is displayed on a screen, user convenience can be improved, for example, if a map projected in a certain gaze direction is temporarily displayed and the gaze direction is changed according to a user operation. For example, if an animation display is made in which the gaze direction changes in real time in conjunction with a user operation, the user can evaluate while having such a feeling as if the user were directly overserving the embryo E in front.

The following methods are, for example, thought as the three-dimensional mapping method for the trophectoderm T. A first method is to give information representing the thickness distribution in each direction to an approximate spherical surface (or spheroidal surface) representing the approximate shape of the trophectoderm T. A second method is to give information on the thickness distribution to a curved surface equivalent to the actual three-dimensional shape of the trophectoderm T. In the latter case, there is a choice as to whether the shape of the curved surface is set to be equivalent to the inner surface Si or the outer surface So of the trophectoderm T.

The outer surface So of the trophectoderm T is in contact with the zona pellucida ZP and, accordingly, the surface shape thereof is relatively smooth. In this sense, the curved surface equivalent to the outer surface So of the trophectoderm T is substantially not very different from a spherical surface. On the other hand, the inner surface Si of the trophectoderm T has unevenness corresponding to the shapes of the individual cells constituting the trophectoderm T. Thus, there is an advantage of more easily grasping an actual uneven shape if mapping is performed on the curved surface equivalent to the inner surface Si of the trophectoderm T.

Note that, similarly to the case of two-dimensional mapping, methods for displaying a thickness while converting the thickness into a luminance, representation methods by contour lines (isoluminance contours), color coding, shading and the like and other methods can be applied as the method for visualizing a thickness on a map surface. A case where mapping is performed on a spherical surface and a case where mapping is performed on the curved surface equivalent to the inner surface Si of the trophectoderm T are illustrated below. A mapping method using contour lines is used.

Figure 13A:
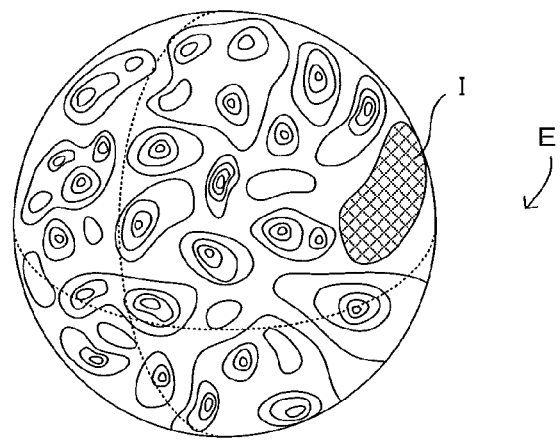
FIGS. 13A and 13B are diagrams showing an example of the three-dimensional mapping method.
Figure 13B:
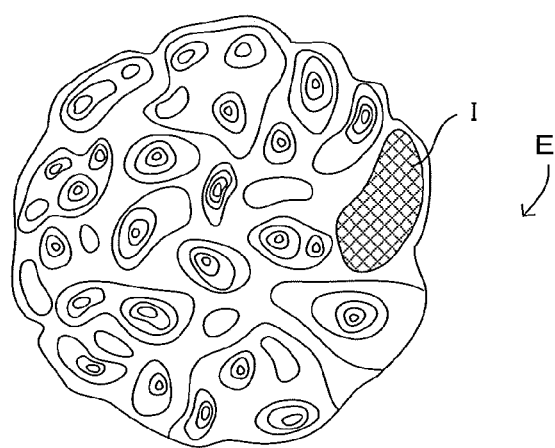

FIGS. 13A and 13B are diagrams showing an example of the three-dimensional mapping method. FIG. 13A shows an example of mapping on a spherical surface. FIG. 13B shows an example of mapping on a curved surface equivalent to the inner surface Si of the trophectoderm T. Here, a three-dimensional map is shown to be projected on a two-dimensional plane, but is actually mapped on a three-dimensional curved surface. In the case of a display output to the screen, variously different gaze directions can be displayed. Note that hatched regions correspond to the inner cell mass I also in these maps.

For example, the three-dimensional map of FIG. 13A can be generated by arranging a pixel at each position on the spherical surface centered on the origin O in the polar coordinate space, the pixel having a luminance corresponding to a thickness calculation result in a radial direction passing through this position. That is, the pixel having a luminance value corresponding to the thickness $T(\theta, \phi)$ may be arranged at an intersection of a radius represented by two angles of deviations $(\theta, \phi)$ and the spherical surface.

In the three-dimensional map, a distortion problem occurring in the two-dimensional map is solved. The two-dimensional map also has a problem that information on a length of the radius, i.e. a distance from the origin O, is not reflected on the map, in addition to the distortion problem. Particularly, if the shape of the specimen S largely deviates from the spherical surface, unevenness displayed on the map is possibly not reflecting the actual shape well. In the three-dimensional map, such a deviation can be reduced, for example, by setting a spheroid closer to the shape of the specimen as an approximate curved surface.

Particularly, by performing mapping on the curved surface reflecting the actual shape as shown in FIG. 13B, a more realistic map can be generated. Information necessary for mapping includes the position of the inner surface Si (or outer surface So) of the trophectoderm T in each radial direction (that is, length of the radius) and the thickness of the trophectoderm T in this direction. These pieces of information are already obtained as $R(\theta, \phi)$ and $T(\theta, \phi)$ in the step of calculating the thickness of the trophectoderm T (Step S116 of FIG. 3). Thus, the three-dimensional map is generated by arranging the pixels having luminance values corresponding to the thicknesses $T(\theta, \phi)$ at the positions represented by the coordinates $(R(\theta, \phi), \theta, \phi)$ in the polar coordinate space.

Note that in the case of projecting and displaying the three-dimensional map shown in FIG. 13B on a two-dimensional display screen, an uneven shape of a map curved surface and the thickness of the trophectoderm T at each position need to be identifiably displayed. Particularly, the shape of a curved surface except an outer peripheral part of a projected two-dimensional figure is possibly difficult to read from a displayed image. To avoid this problem, the shape of the curved surface and the thickness at each point need to be represented by different methods. For example, the shape of the curved surface may be represented by contour lines, whereas the thickness in each part may be represented by shading or color coding.

Referring back to FIG. 3, the description of the method for counting the number of the cells constituting the trophectoderm T from the thickness distribution mapped in this way is continued. The unevenness of the surface of the trophectoderm T visualized as described above is due to the shapes of the individual cells. From this, for example, if the thickness is represented by the luminance, regions studded on the map and having a higher luminance than the surrounding are thought to correspond to protrusion parts corresponding one by one to the cells in the trophectoderm T. Thus, where the individual cells are located can be estimated if the regions thicker than the surrounding, i.e. having a high luminance, are extracted. Further, the number of the cells constituting the trophectoderm T can be counted.

From this, peaks appearing in a thickness profile of the trophectoderm T indicate the protrusion parts corresponding to the individual cells constituting the trophectoderm T with a high possibility. Accordingly, significant peaks in the thickness profile are searched in Step S118. By doing so, the protrusion parts are indirectly detected.

Figure 14A:
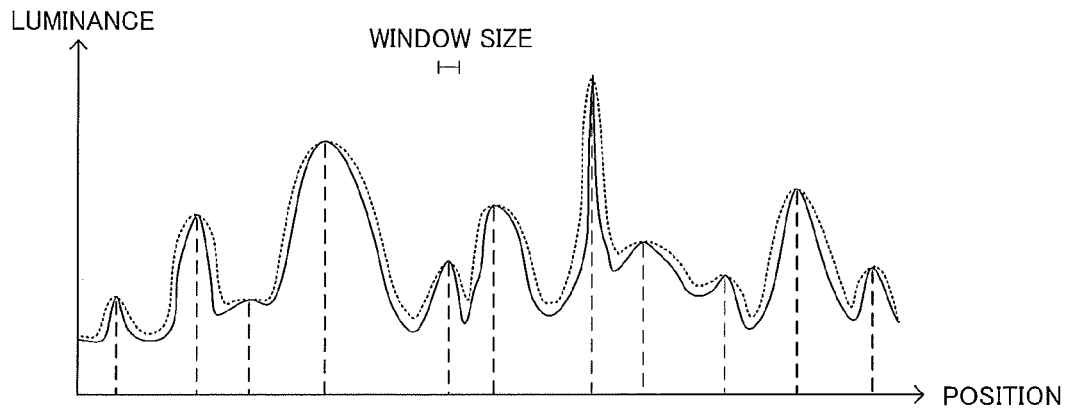
FIGS. 14A to 14C are graphs showing the principle of a peak detection process.
Figure 14B:
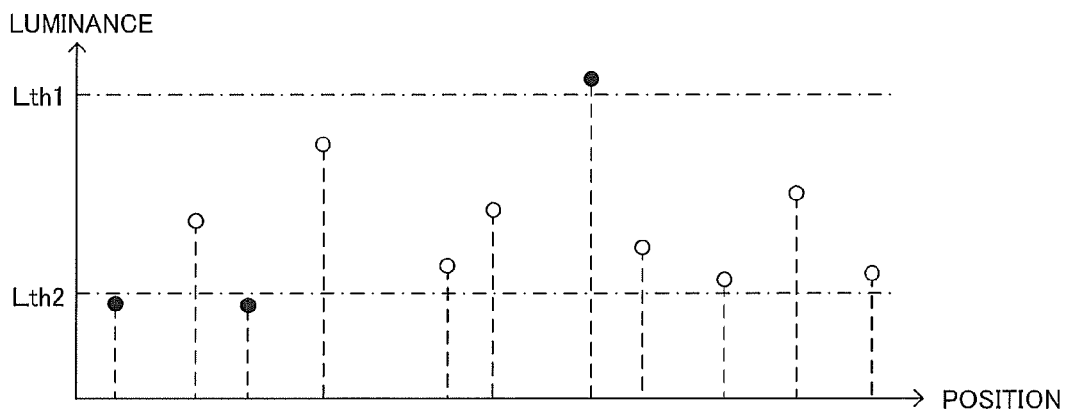
Figure 14C:
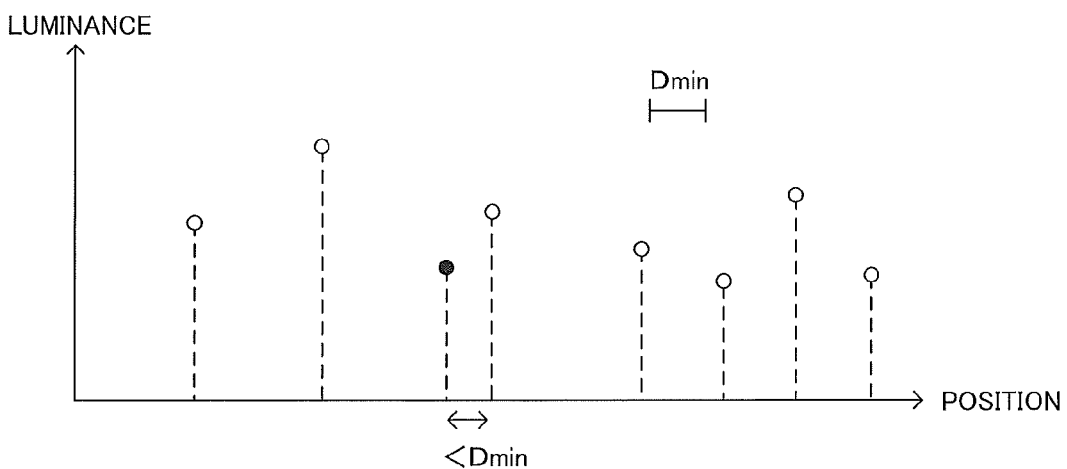
Figure 15:
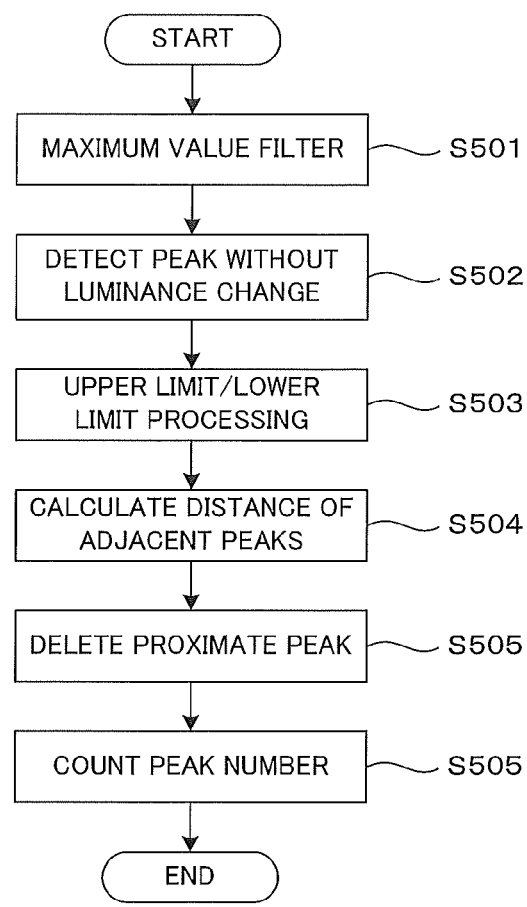
FIG. 15 is a flow chart showing the peak detection process.

FIGS. 14A to 14C are graphs showing the principle of a peak detection process. Further, FIG. 15 is a flow chart showing the peak detection process. As shown by a solid line in FIG. 14A, a relationship (thickness profile) of the position in a certain radial direction on a map and a luminance (i.e. thickness) is plotted along this direction. Then, the luminance varies at each position, and peaks having a prominently high luminance with respect to the surrounding appear. These become candidates for peaks corresponding to the positions of the cells.

First, regions having a higher luminance than the surrounding are extracted. Specifically, a maximum value filter processing is performed for the thickness profile shown by the solid line (Step S501). By performing the maximum value filter processing with a window size appropriately set, peak widths of the profile expand as shown by a dotted line in FIG. 14A. Although the luminance values are increased at positions other than the peaks by the maximum value filter processing, the luminance values do not change at peak positions. Accordingly, such positions where the luminance value does not change (shown by broken lines in FIG. 14A) are extracted as peak candidates (Step S502).

FIG. 14B shows the extracted peak candidates. If the luminance in the peak is extremely high or extremely low, this peak is possibly different from an object to be detected such as an image noise or the peak not corresponding to the cell. Accordingly, a threshold value Lth1 specifying an upper limit value, a threshold value Lth2 specifying a lower limit value are set for the luminance value. Out of peak candidates, those exceeding the threshold value Lth1 and those falling below the threshold value Lth2 are deleted (Step S503). In FIG. 15, this processing is written as an "upper limit/lower limit processing". In FIG. 14B, black circles indicate the peak candidates to be deleted by this processing. Further, white circles indicate the peak candidates remaining without being deleted.

In the object of this embodiment to specify the individual cells constituting the trophectoderm T, the threshold values Lth1, Lth2 can be set to correspond to an upper limit value and a lower limit value of a reasonable size as the cells constituting the trophectoderm T. In this way, an extremely large or small peak candidate, which cannot be regarded as one cell, can be excluded. As a result, an error affecting a count result of the number of the cells can be reduced. Note that although the upper and lower limit values are set for the peak luminance value here, either one of these limit values may be set. Further, the upper limit/lower limit processing may be omitted if such an omission does not cause a large error.

On the other hand, there is a reasonable cell size also in a direction along the surface of the trophectoderm T. In other words, if the peak candidates properly represent the individual cells, distances between those peaks should be within a predetermined range corresponding to the cell size. Accordingly, distances between adjacent ones of the remaining peak candidates are calculated (Step S504). If there are extremely proximate peak candidates, one of these is regarded as a noise and deleted (Step S505). It is realistic to delete the smaller peak, out of the peaks in such a relationship. FIG. 14C shows an example of a result of deleting the peak candidates whose distance to the adjacent peak is shorter than a minimum distance Dmin set in advance.

In this way, the peaks indicated by the white circles in FIG. 14C finally remain. These peak positions are thought to represent the positions of the protrusion parts corresponding to the individual cells. That is, the protrusion parts present in the trophectoderm T surrounding the blastocoel cavity B are detected by the processing thus far.

Note that although the principle is described using a linear thickness profile to facilitate the understanding of a concept here, an actual thickness profile is two-dimensional in the case of using a two-dimensional map and three-dimensional in the case of using a three-dimensional map. Thus, in the case of using a two-dimensional map, the maximum value filter processing in Step S501 is two-dimensional filtering. To apply a fixed window size in each direction, a circular filter is used in this case. Further, an inter-peak distance is also a distance on a two-dimensional map plane.

In the two-dimensional map, radius length information is not reflected and distortion becomes larger toward the peripheral part. Thus, strictly speaking, it cannot be said that ideal filtering is performed using a circular filter window. However, for the purpose of detecting the peaks corresponding to the individual cell positions, practically sufficient accuracy can be obtained by such filtering. Particularly, in the method for mapping by dividing an object into a plurality of sections as shown in FIGS. 12A and 12B, an error due to such a cause can be sufficiently suppressed since the peripheral edge part of the map where distortion is large is not used. By setting the range indicated by the dotted line in FIG. 12B to be at least larger than the size of the filter window, an error caused by filtering is avoided.

Further, in the case of showing the thickness distribution by a three-dimensional map, the filter window has a three-dimensional spherical shape. That is, the maximum value filter processing is spherical filtering. Further, the inter-peak distance is a distance in a three-dimensional space.

In the three-dimensional map (FIG. 13A) obtained by projecting the thickness of the trophectoderm T at each position on the spherical surface, the radius length information from the origin O to the target pixel is not reflected on the processing. This has an effect of simplifying the processing, but possibly becomes an error factor in filtering. On the other hand, in the three-dimensional map (FIG. 13B) obtained by projection on the curved surface corresponding to the surface shape of the trophectoderm T, the distance from the origin O is reflected on the position of the target pixel. Thus, peaks can be properly detected while eliminating errors by spherical filtering centered on the target pixels.

Figure 16A:
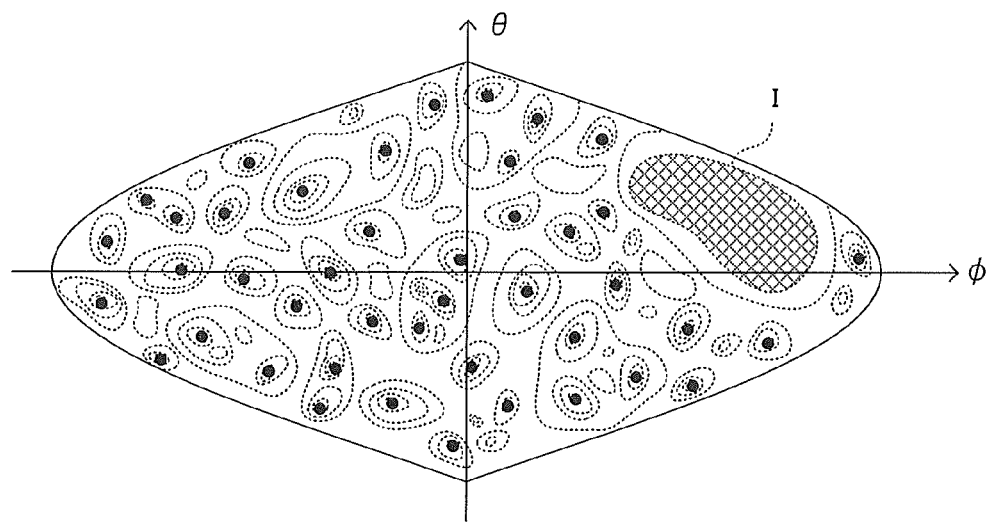
FIGS. 16A and 16B are graphs showing an example of peak positions detected on a two-dimensional map.
Figure 16B:
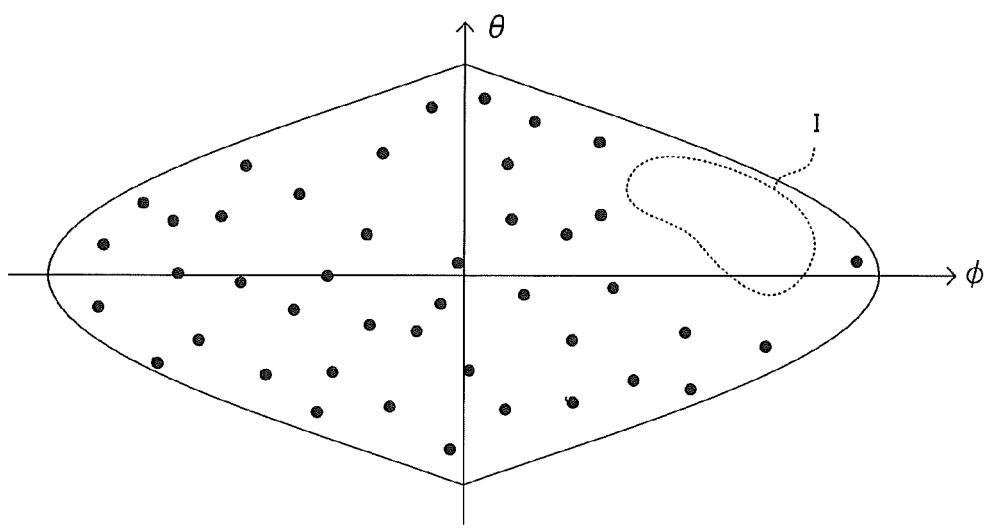

FIGS. 16A and 16B are graphs showing an example of peak positions detected on a two-dimensional map. Out of regions where the thickness of the trophectoderm T is locally prominent as compared to the surrounding as shown by dotted lines in FIG. 16A, those falling under the above conditions are detected as significant peaks (black circles). These peaks are thought to correspond one by one to the cells constituting the trophectoderm T. Only the detected meaningful peaks are plotted on the two-dimensional map in FIG. 16B. If the meaningful peaks corresponding to the individual cells are detected in this way, the number of the protrusion parts is obtained by counting the number of these peaks (Step S119). In this way, the number of the cells constituting the trophectoderm T can be indirectly known.

In a region occupied by the inner cell mass I, it is difficult to know a distribution of the cells constituting the trophectoderm T. However, the number of the cells in the entire embryo E can be estimated by assuming that the cells are distributed nearly at the same density as in other regions. That is, a cell density is obtained by dividing the number of the counted cells by a surface area of the trophectoderm T except a part in contact with the inner cell mass I. Then, a total number of the cells constituting the entire trophectoderm T can be estimated by multiplying a surface area of the trophectoderm T including the part in contact with the inner cell mass I by the cell density.

Figure 17A:
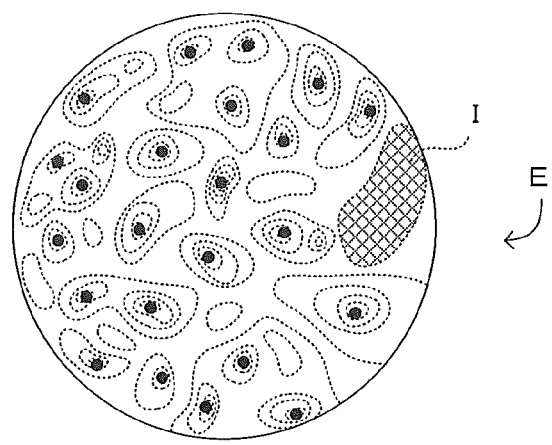
FIGS. 17A and 17B are diagrams showing an example of peak positions detected on a three-dimensional map.
Figure 17B:
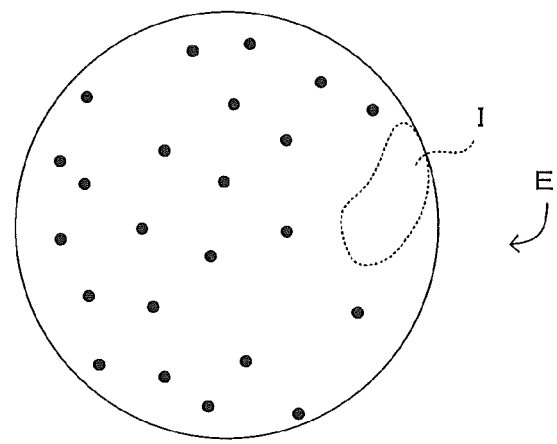

FIGS. 17A and 17B are diagrams showing an example of peak positions detected on a three-dimensional map. Similarly to the above, out of regions where the thickness of the trophectoderm T is locally prominent as compared to the surrounding, those falling under the above conditions are detected as meaningful peaks (black circles). The number of the cells constituting the trophectoderm T can be estimated by counting these in an entire map curved surface. A region occupied by the inner cell mass I can be similarly handled as in the case of the two-dimensional map.

As described above, in evaluating the cells in the layer covering the cavity inside, the protrusion parts thicker than the surrounding are detected in the thickness profile obtained from the three-dimensional image and these are regarded to correspond to the individual cells, whereby the cells can be easily quantitatively evaluated. If the outer shape of an object has a substantially spherical shape, the process can be facilitated by representing image data in the polar coordinate space.

Note that the invention is not limited to the above embodiment and various changes other than the aforementioned ones can be made without departing from the gist of the invention. For example, the image processing apparatus 1 of the above embodiment has the function of OCT-imaging and optically and microscopically imaging the specimen S and the function of generating and outputting an output image from imaging data. However, the image processing method of the invention can also be carried out by a computer device having no imaging function itself. The computer device may obtain imaging data obtained by imaging in another device having an imaging function. To enable this, the invention may be carried out in the form of a software program for causing the computer device to perform the respective processing steps of FIG. 3 except Step S101.

Such a program can be distributed, for example, in the form of downloading via an electric communication line such as Internet. Further, the program can be distributed by distributing a computer-readable recording medium storing this program non-transiently. Further, by causing this program to be read into an existing OCT imaging device via an interface, the invention can be carried out by this device.

Further, for example in the above embodiment, after the zona pellucida is separated from the three-dimensional image of the embryo E, the remaining structures are further separated into the trophectoderm and the inner cell mass. However, in the gist of the invention, it is sufficient to separate the zona pellucida from the other structures and any further separation is not essential. Further, images in these divided regions may be further processed.

Further, for example in the above embodiment, the structure regions where the structures having a relatively high density and the other regions are separated by binarizing the three-dimensional image obtained by OCT imaging. By doing so, there is an advantage of being able to clearly specify, for example, the position of the surface of the embryo without being affected by microstructures of the surface, image noises and the like by clarifying the positions of the structures and the ranges occupied thereby in the image. However, the separation of the zona pellucida is also possible without such a binarization.

Further, in the above embodiment, the information useful for the evaluation operation by the user is presented by distinguishing and showing the region occupied by the zona pellucida and the other regions from the three-dimensional image obtained by OCT imaging. Information presentation to the user is not limited to this and various pieces of quantitative information obtained by analyzing a three-dimensional image may be combined and presented to the user.

Further, in the above embodiment, various processings are performed after the three-dimensional image data is transformed into the polar coordinate data. However, protrusion parts similar to the above ones can be detected even without performing such a coordinate transform. For example, in the case of using the Distance Transform function for thickness detection, the center (center of gravity) of the embryo needs not necessarily be set. Accordingly, the thickness can be directly obtained from the three-dimensional image data of the trophectoderm represented by the orthogonal coordinate system. In the case of using the three-dimensional map shown in FIG. 13B, a map can be generated in the XYZ orthogonal coordinate space as long as the position of the inner or outer surface is specified. Therefore, if these processings are combined, a transform into the polar coordinate system is said to be unnecessary.

Further, for example in the above embodiment, the thickness distribution in the trophectoderm is obtained after the zona pellucida and the trophectoderm are separated from the three-dimensional image of the embryo E. However, if the thickness of the zona pellucida is, for example, regarded as constant, a thickness change in the thickness distribution substantially reflects the thickness of the trophectoderm even if the thickness distribution of the trophectoderm is obtained without separating the zona pellucida and the trophectoderm.

Further, in the above embodiment, the invention is applied to the evaluation of the embryo in the blastocyst stage. However, the application range of the invention is not limited to this and the invention can be applied to the observation/evaluation of various cell aggregates with a cavity inside. For example, an intestinal epithelium organoid has a cavity similar to the above inside, and the surface thereof is covered with a layer formed by cells. The invention can be suitably applied also to the evaluation of such a cell layer.

As the specific embodiment has been illustrated and described above, a thickness of a cell aggregate along a radius having one point inside the cell aggregate as an origin can be, for example, obtained by the image processing method according to the invention. If the cell aggregate has an outer shape approximate to a sphere or spheroid, the processings can be facilitated by obtaining the thickness in a radial direction in this way.

Further, it is, for example, possible to generate polar coordinate data representing the position of each point of a cell aggregate as a position in a polar coordinate space from three-dimensional image data and obtain a thickness distribution of the cell aggregate based on the polar coordinate data. Particularly, it is preferred to use a center of gravity of the cell aggregate as an origin of the polar coordinate space. According to such a configuration, data processing for a cell aggregate having a shape approximate to a sphere or spheroid can be facilitated.

In this case, it is, for example, possible to generate a thickness profile of the cell aggregate associating a radial direction in the polar coordinate space and the thickness of the cell aggregate obtained in this radial direction and to detect protrusion parts based on this thickness profile. According to such a configuration, the protrusion parts having a prominent thickness with respect to the surrounding can be easily detected from changes in the thickness of the cell aggregate represented by the thickness profile.

Specifically, the maximum value filter processing can be applied to the thickness profile and positions where there is no change in value before and after the processing can be detected as the positions of the protrusion parts. Since the thickness of the cell aggregate is larger than the surrounding at the position of the protrusion part, the value of the thickness is not changed by the maximum value filter processing. On the other hand, the values after the maximum value filter processing may change if there is a thicker region surrounding the region to be subjected. Utilizing this, parts having a larger thickness than the surrounding can be detected.

For example, the thickness profile can be represented by a three-dimensional map in which pixels are arranged at positions corresponding to an inner or outer surface of the cell aggregate, the pixel having a luminance value corresponding to the thickness of the cell aggregate at the corresponding position. Further, the thickness profile can be, for example, represented by a three-dimensional map in which a pixel is arranged at each position of a surface of an approximate sphere of the cell aggregate in the polar coordinate space, the pixel having a luminance value corresponding to the thickness of the cell aggregate in a radial direction passing through this position. In these cases, the maximum value filter processing can be performed as a spatial filter processing for a spherical region centered on a target pixel.

On the other hand, the thickness profile can also be represented by a two-dimensional map in which pixels are arranged on a coordinate plane having two angles of deviation represented by polar coordinate data as coordinate axes, the pixel having a luminance value corresponding to the thickness of the cell aggregate in one radial direction specified by the two angles of deviations in the polar coordinate space. In this case, the maximum value filter processing can be performed as a two-dimensional filter processing for a circular region centered on a target pixel on the two-dimensional map. Note that the pseudo-cylindrical projection can be, for example, used as a method for representing a thickness distribution in a three-dimensional space by a two-dimensional map.

Further, for example, the polar coordinate space may be divided into a plurality of spaces by planes passing through the origin and a two-dimensional map may be generated and the protrusion parts may be detected individually for each of the divided spaces. In the case of representing the shape of an object in a three-dimensional space by a two-dimensional map, the distortion of the object on the map is unavoidable. By dividing the space and individually generating the maps, a large distortion at a specific location can be avoided and the detection accuracy of the thickness distribution can be enhanced.

Further, the image processing method according to the invention may, for example, further include a step of counting the number of the detected protrusion parts. By obtaining quantitative information in this way, more useful information can be provided for users. For example, if the cell aggregate as an object is an embryo in a blastocyst stage or an intestinal epithelium organoid, the invention can be applied to the counting of cells constituting the surface thereof.

Further, in the image processing method using an image of a fertilized egg as a processing object, a region corresponding to a zona pellucida can be specified, for example, using a classification algorithm machine-learned in advance using an image of the zona pellucida captured by optical microscope imaging as a teacher image. According to such a configuration, a region having strong morphological characteristics of the zona pellucida can be specified from an optical microscope image with high accuracy by using an appropriate classification algorithm.

For example, the semantic segmentation method can be used as the classification algorithm. According to this method, an image can be divided on a pixel basis according to a characteristic of the image. Thus, a region of a zona pellucida can be accurately specified from a microscope image and the thickness thereof can be properly evaluated.

Further, for example, the optical microscope imaging of the fertilized egg may be performed a plurality of times with a focus depth varied, and an average thickness of the zona pellucida may be obtained from an image having a largest area of a region corresponding to the zona pellucida, out of those images. There is a high probability that the image in which the zona pellucida is specified in a wide range is an image best focused on the zona pellucida, i.e. captured in a state where the zona pellucida is clear. By using such an image, the thickness of the zona pellucida can be accurately obtained.

In this case, a value obtained by multiplying the area of the region specified using the classification algorithm by a coefficient determined based on a magnitude of a luminance change in a boundary between the inside and outside of this region can be, for example, used as an index value indicating the area of the region corresponding to the zona pellucida. For example, the square of a luminance value difference between the inside and outside of the boundary can be the coefficient. According to such a configuration, it is possible to reduce a risk of erroneously determining an image having a large apparent area of the zona pellucida due to blurring at the time of imaging as a focused image.

Further, for example, a region in a range of an average thickness from the outer edge, out of the structure region, can be regarded as the zona pellucida. In a properly cultured fertilized egg, a thickness of a zona pellucida covering the surface of the fertilized egg is substantially uniform. Therefore, a region up to a depth corresponding to the average thickness obtained from a microscope image from the outer edge of the fertilized egg in a three-dimensional image is said to be a region occupied by the zona pellucida.

In this case, regions of the structure region other than the zona pellucida may be regarded as regions of an inner cell mass and a trophectoderm. Main structures constituting a properly cultured fertilized egg in a blastocyst stage are the zona pellucida, the trophectoderm and the inner cell mass. Therefore, the regions of the structure region other than the zona pellucida can be thought to be occupied by the trophectoderm and the inner cell mass.

Further, for example, a region occupied by pixels having a luminance value equal to or more than a predetermined value may be specified from three-dimensional image data and this region may be regarded as a structure region. In an OCT image, luminance is high in structures having a relatively high density and low-density regions around those structures have a low luminance. Therefore, if a region having a certain luminance is specified, there is a high probability that that region is a structure region occupied by a structure having a high density.

This invention is suitable in assisting an operation of observing and evaluating a cell aggregate with a cavity inside and can be, for example, utilized for the purpose of assisting an operation of evaluating a state of a cultured embryo (fertilized egg) and selecting a good embryo with a higher pregnancy success rate in assisted reproductive technology.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. An image processing method for an image of a cell aggregate with a cavity inside as a processing object, the image processing method comprising:
obtaining three-dimensional image data representing a three-dimensional image of the cell aggregate obtained by optical coherence tomography imaging;
obtaining a thickness distribution representing a thickness of the cell aggregate between an outer surface of the cell aggregate facing an outside space and an inner surface thereof facing the cavity at each position based on the three-dimensional image data; and detecting protrusion parts having a prominent thickness as compared to a surrounding region based on the thickness distribution, wherein polar coordinate data representing a position of each point of the cell aggregate as a position in a polar coordinate space are generated from three-dimensional image data, wherein the thickness distribution of the cell aggregate is obtained based on the polar coordinate data, wherein each of the protrusion parts is detected based on a thickness profile of the cell aggregate associating a radial direction in the polar coordinate space and the thickness of the cell aggregate obtained in this radial direction, wherein a maximum value filter processing is applied to the thickness profile, and wherein a position where there is no change in value before and after the maximum value filter processing is detected as a position of the protrusion part.

2. The image processing method according to claim 1, wherein the thickness of the cell aggregate along a radius having one point inside the cell aggregate as an origin is obtained.

3. The image processing method according to claim 1, wherein an origin of the polar coordinate space is set to a position of a center of gravity of the cell aggregate.

4. The image processing method according to claim 1, wherein:
the thickness profile is represented by a three-dimensional map in which pixels are arranged at positions corresponding to an inner or outer surface of the cell aggregate, each of the pixels having a luminance value corresponding to the thickness of the cell aggregate at a corresponding position; and
the maximum value filter processing is a spatial filter processing for a spherical region centered on a target pixel.

5. The image processing method according to claim 1, wherein:
the thickness profile is represented by a three-dimensional map in which a pixel is arranged at each position of a surface of an approximate sphere of the cell aggregate in the polar coordinate space, the pixel having a luminance value corresponding to the thickness of the cell aggregate in a radial direction passing through this position; and
the maximum value filter processing is a spatial filter processing for a spherical region centered on a target pixel.

6. The image processing method according to claim 1, wherein:
the thickness profile is represented by a two-dimensional map in which a pixel is arranged on a coordinate plane having two angles of deviation represented by polar coordinate data as coordinate axes, the pixel having a luminance value corresponding to the thickness of the cell aggregate in one radial direction specified by the two angles of deviations in the polar coordinate space; and the maximum value filter processing is a two-dimensional filter processing for a circular region centered on a target pixel on the two-dimensional map.

7. The image processing method according to claim 6, wherein the two-dimensional map is generated by a pseudo-cylindrical projection method.

8. The image processing method according to claim 6, wherein:
the polar coordinate space is divided into a plurality of spaces by planes passing through the origin; and
a two-dimensional map is generated and the protrusion parts are detected individually for each of the plurality of spaces created by dividing the polar coordinate space.

9. The image processing method according to claim 1, further comprising counting a number of the detected protrusion parts.

10. A computer-readable recording medium which stores non-transiently a computer program causing a computer to execute a processing which includes steps of:
obtaining a thickness distribution representing a thickness of a cell aggregate with a cavity inside between an outer surface of the cell aggregate facing an outside space and an inner surface thereof facing the cavity at each position based on three-dimensional image data representing a three-dimensional image of the cell aggregate obtained by optical coherence tomography imaging; and detecting protrusion parts having a prominent thickness as compared to a surrounding region based on the thickness distribution, wherein polar coordinate data representing a position of each point of the cell aggregate as a position in a polar coordinate space are generated from three-dimensional image data, wherein the thickness distribution of the cell aggregate is obtained based on the polar coordinate data, wherein the protrusion parts are detected based on a thickness profile of the cell aggregate associating a radial direction in the polar coordinate space and the thickness of the cell aggregate obtained in this radial direction, wherein a maximum value filter processing is applied to the thickness profile, and wherein a position where there is no change in value before and after the maximum value filter processing is detected as the position of the protrusion part.

* * * * *